United States Patent [19]
Yamakawa

[11] Patent Number: 5,671,094
[45] Date of Patent: Sep. 23, 1997

[54] ZOOM LENS SYSTEM IN FINITE CONJUGATE DISTANCE

[75] Inventor: Hiromitsu Yamakawa, Omiya, Japan

[73] Assignee: Fuji Photo Optical Co., Ltd., Omiya, Japan

[21] Appl. No.: 706,566

[22] Filed: Sep. 5, 1996

[30] Foreign Application Priority Data

Oct. 6, 1995 [JP] Japan .................................. 7-286873

[51] Int. Cl.$^6$ ................................................ G02B 15/14
[52] U.S. Cl. ........................................... 359/679; 359/688
[58] Field of Search ........................... 359/679, 686–688, 359/771–783

[56] References Cited

U.S. PATENT DOCUMENTS 4,149,774  4/1979  Hirano et al. ........................... 359/679

FOREIGN PATENT DOCUMENTS 59-61814  4/1984  Japan .
62-180317  8/1987  Japan .

*Primary Examiner*—David C. Nelms
*Assistant Examiner*—John P. Cornely
*Attorney, Agent, or Firm*—Ronald R. Snider

[57] ABSTRACT

With a stop disposed at the center, a lens system are composed of four sheets of positive, negative, negative, and positive lenses. At the time of variable magnification, the whole lens system is moved while distances between the lenses are changed, whereby a low cost and a compact size are attained in a zoom lens system for copying. This lens system is constituted by four sheets of positive, negative, negative, and positive lenses ($L_1$ to $L_4$) which are disposed in pairs laterally symmetrical to each other with respect to the stop. At the time of reducing or enlarging, the distance between the first lens ($L_1$) and second lens ($L_2$), the distance between the third lens ($L_3$) and fourth lens ($L_4$), and the distance between the second lens ($L_2$) and third lens ($L_3$) are made larger than those under real-size magnification, while the whole system is moved with the distance from the object surface to the imaging surface being held substantially constant so as to attain variable power.

3 Claims, 25 Drawing Sheets

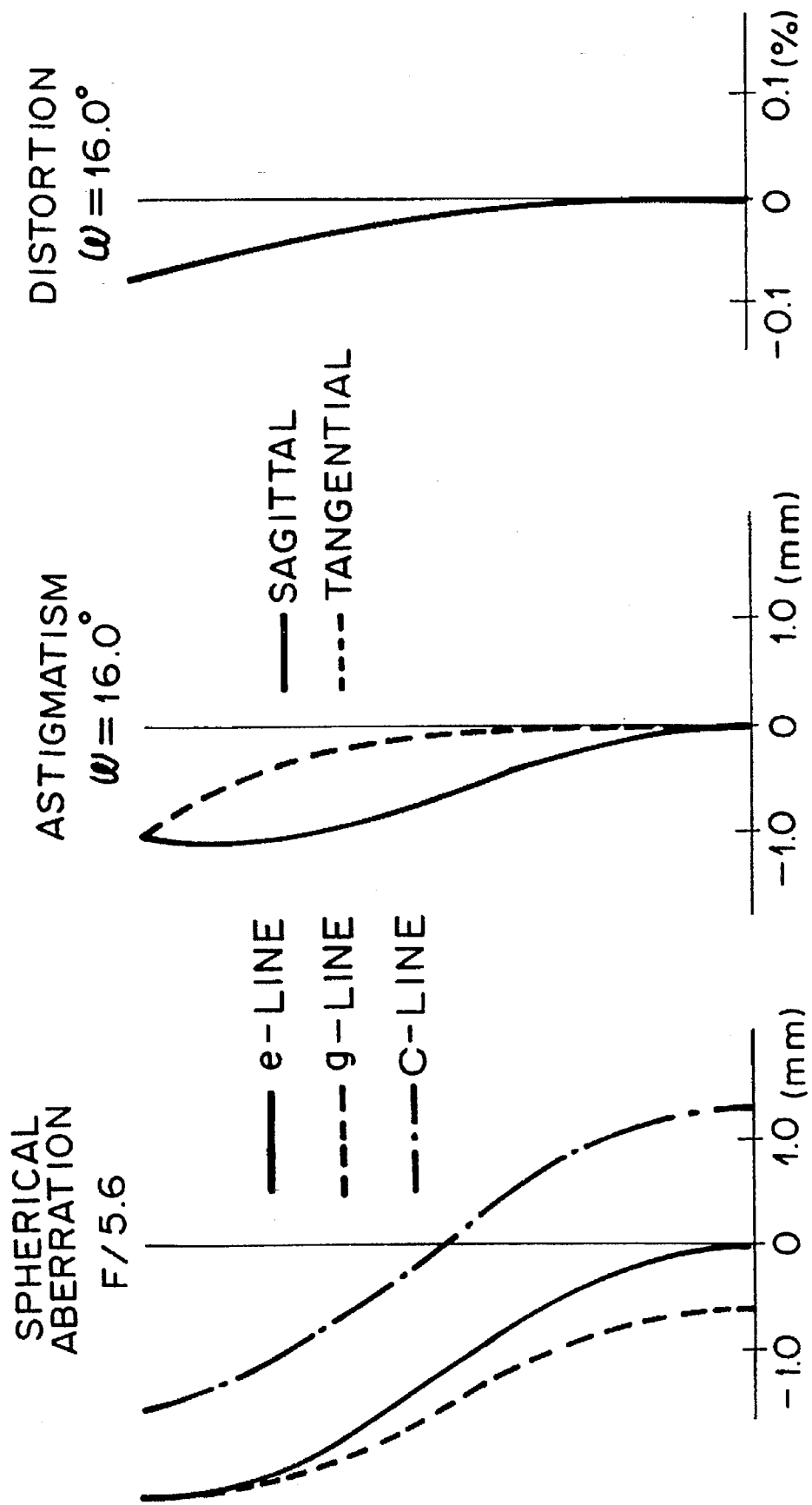

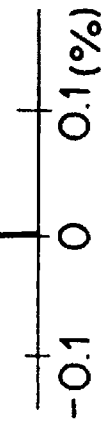

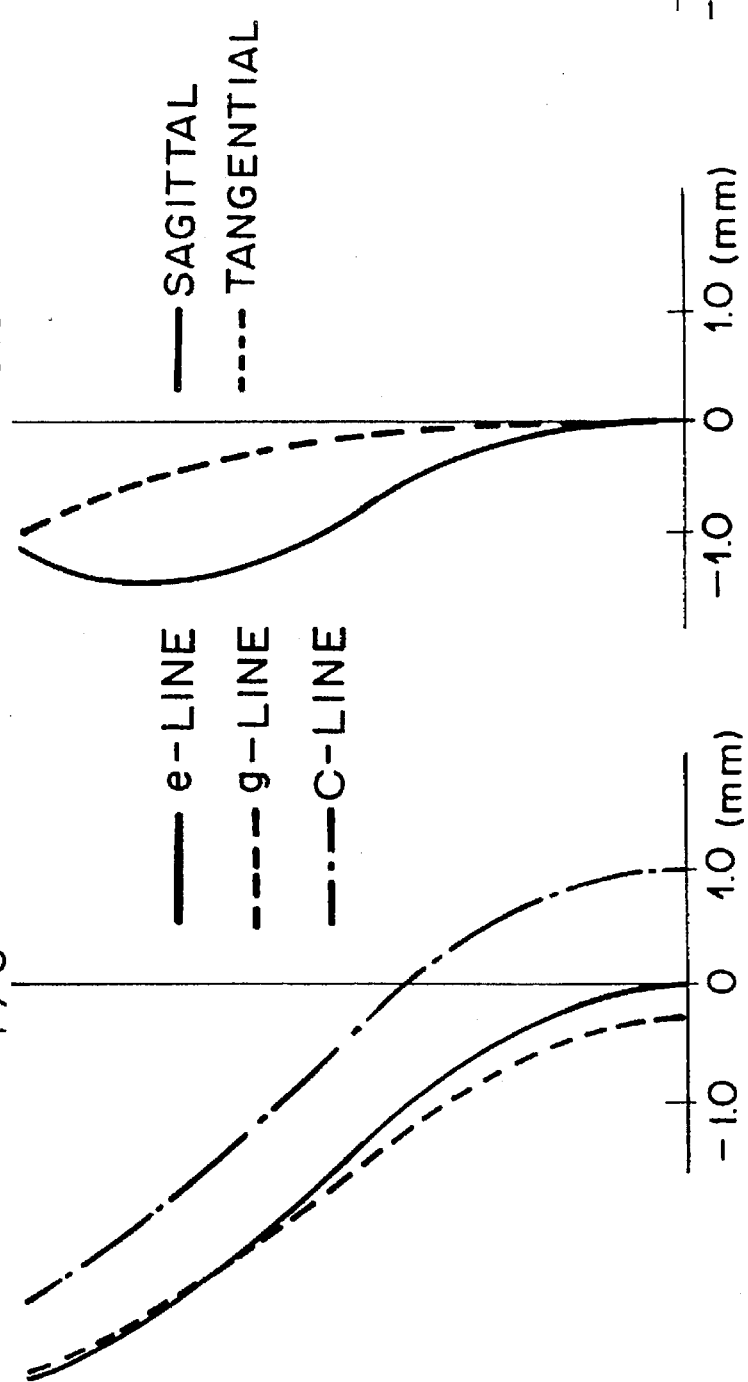

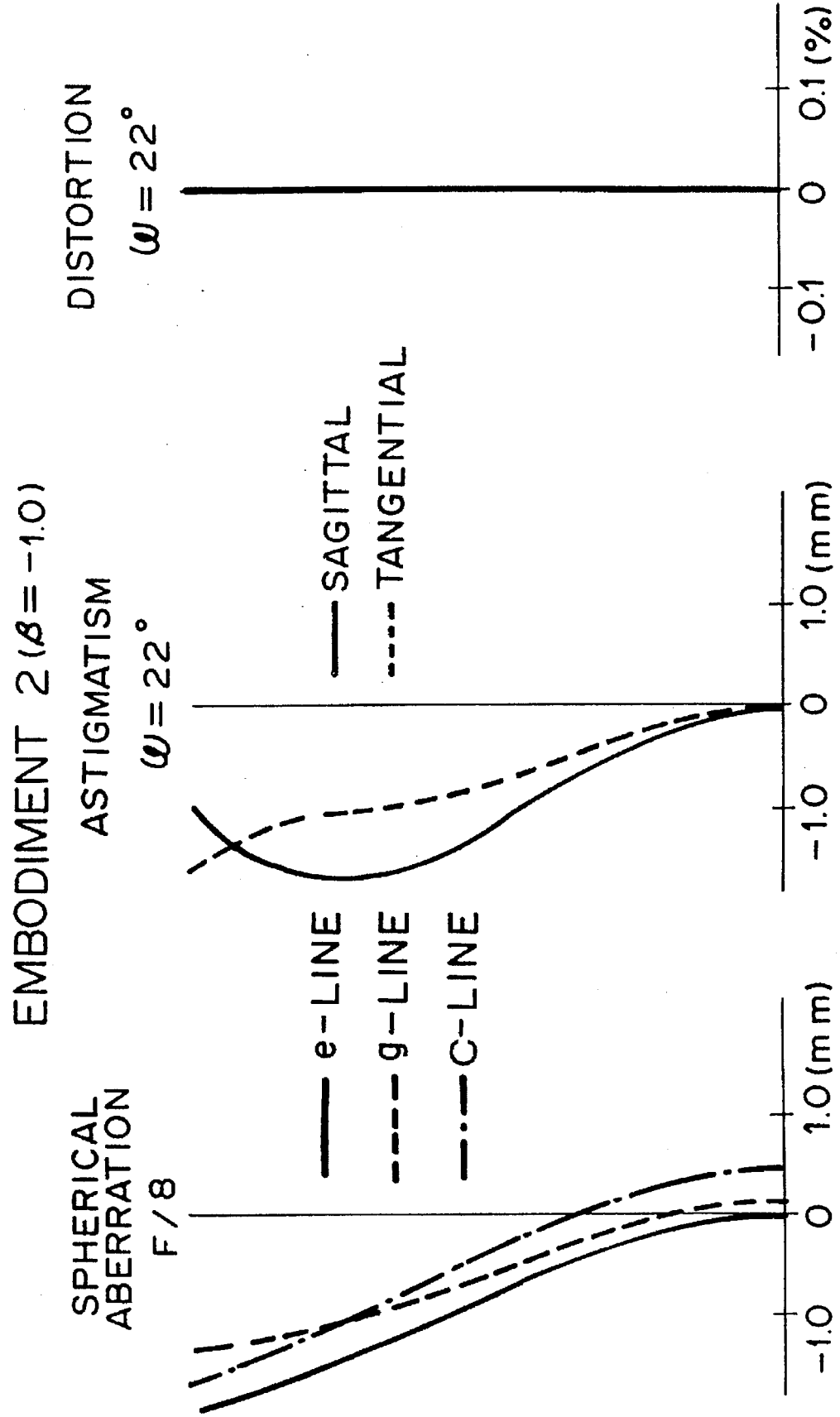

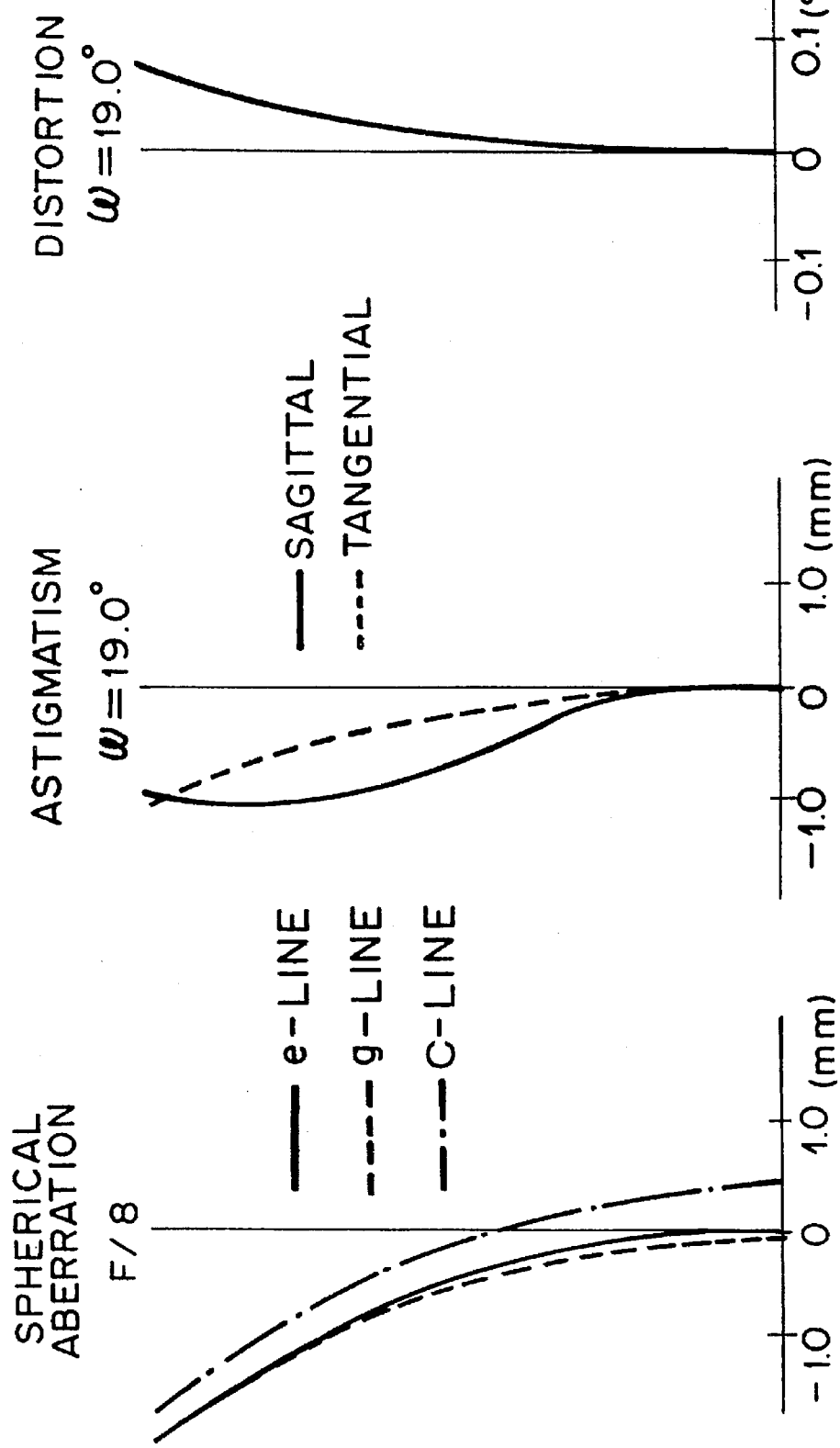

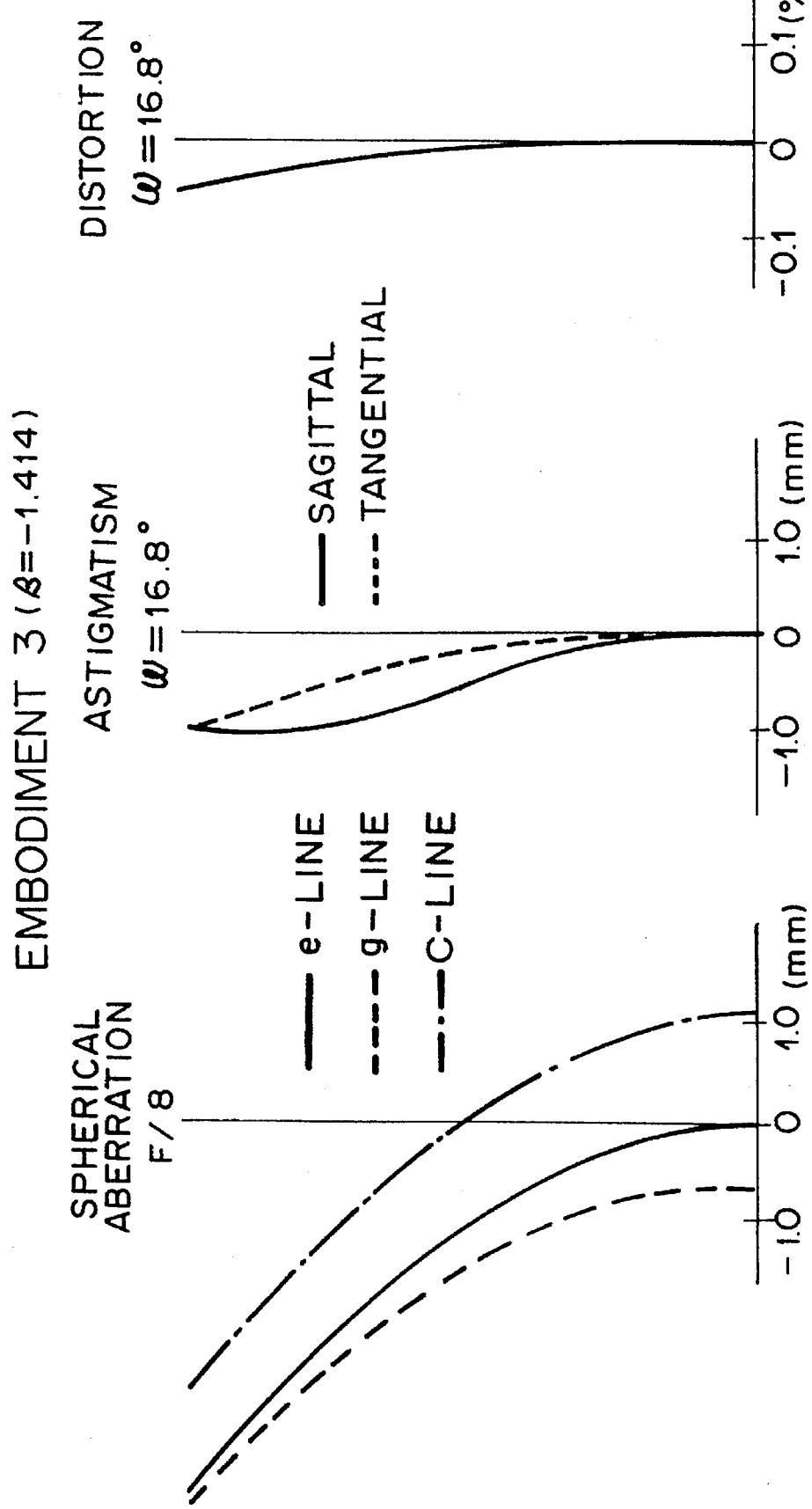

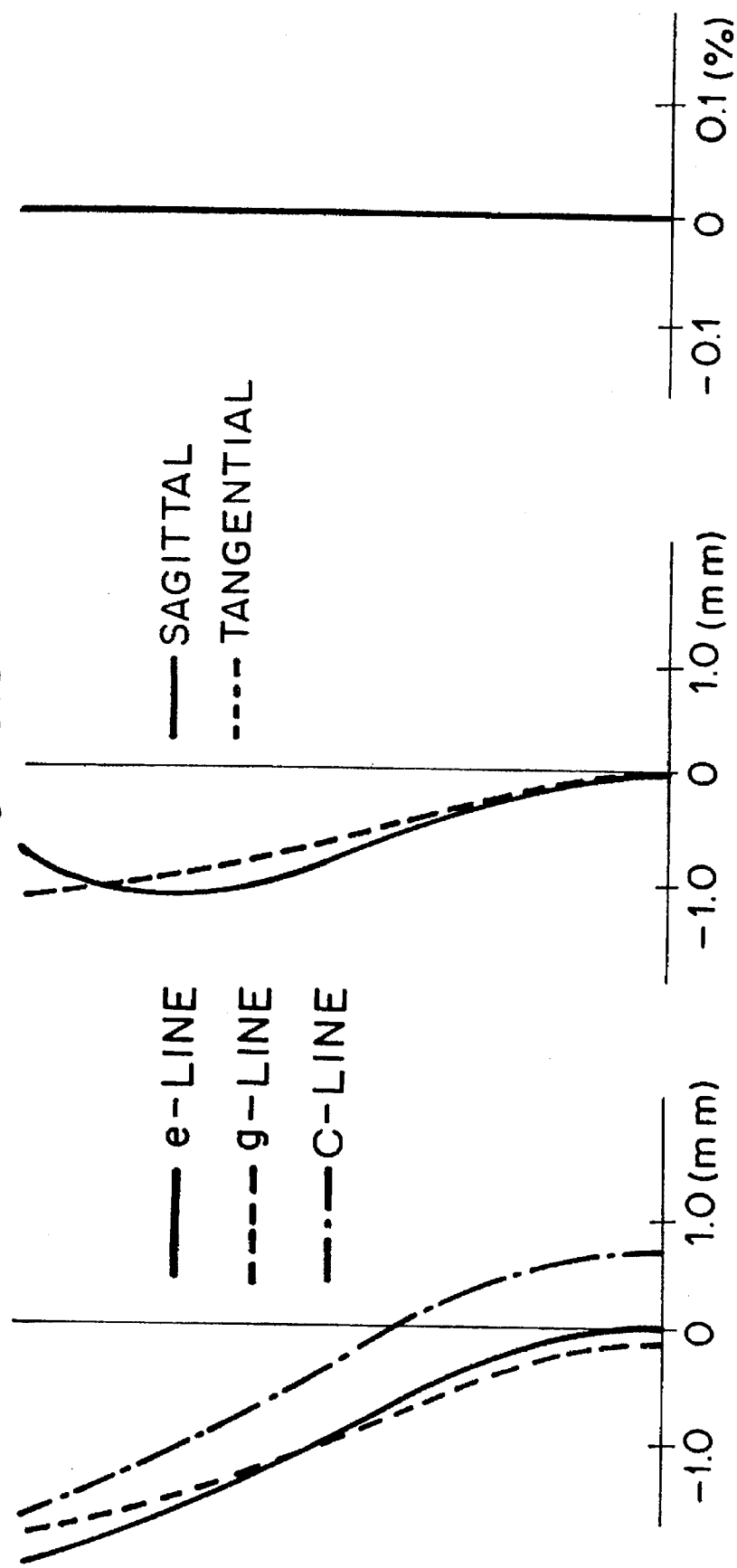

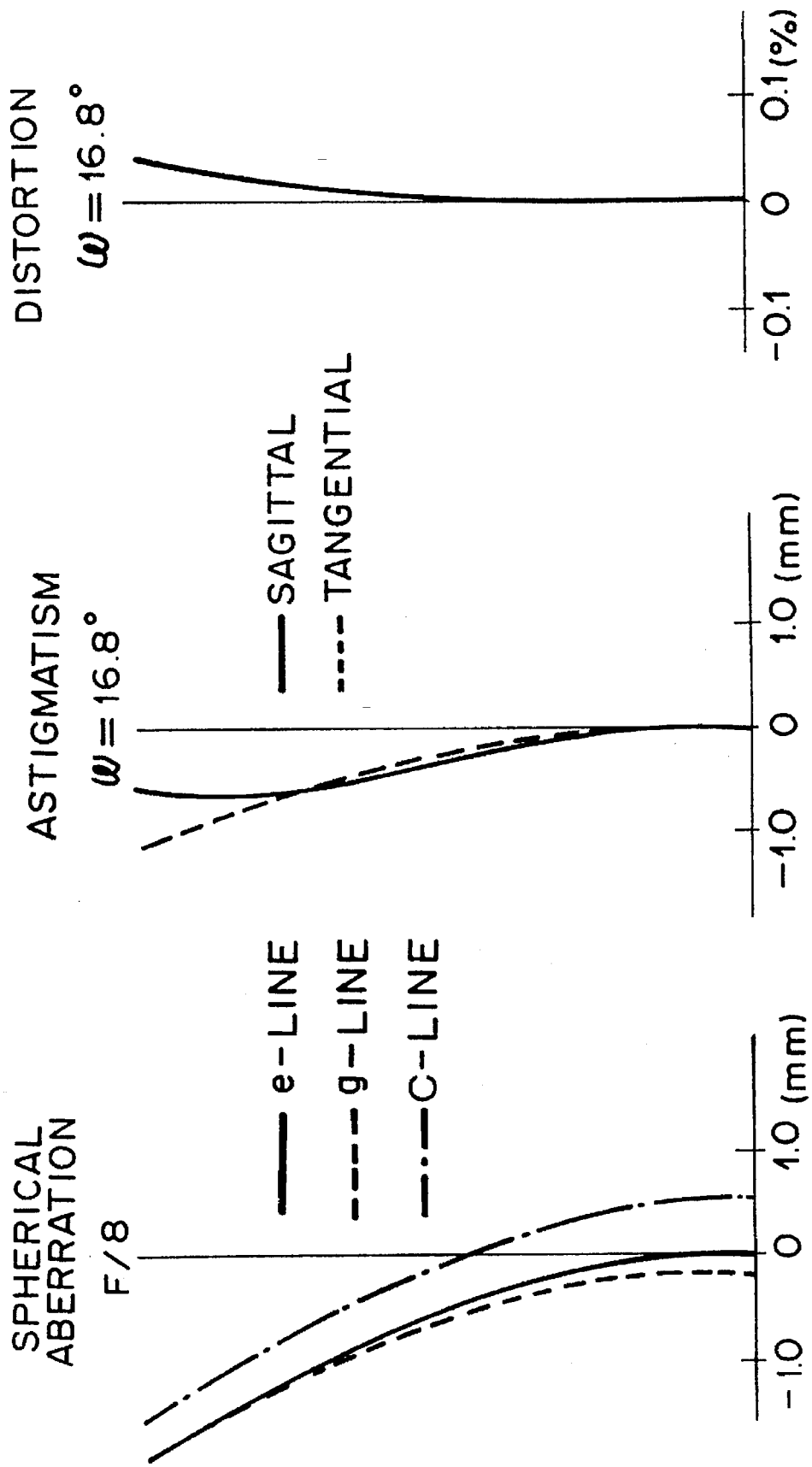

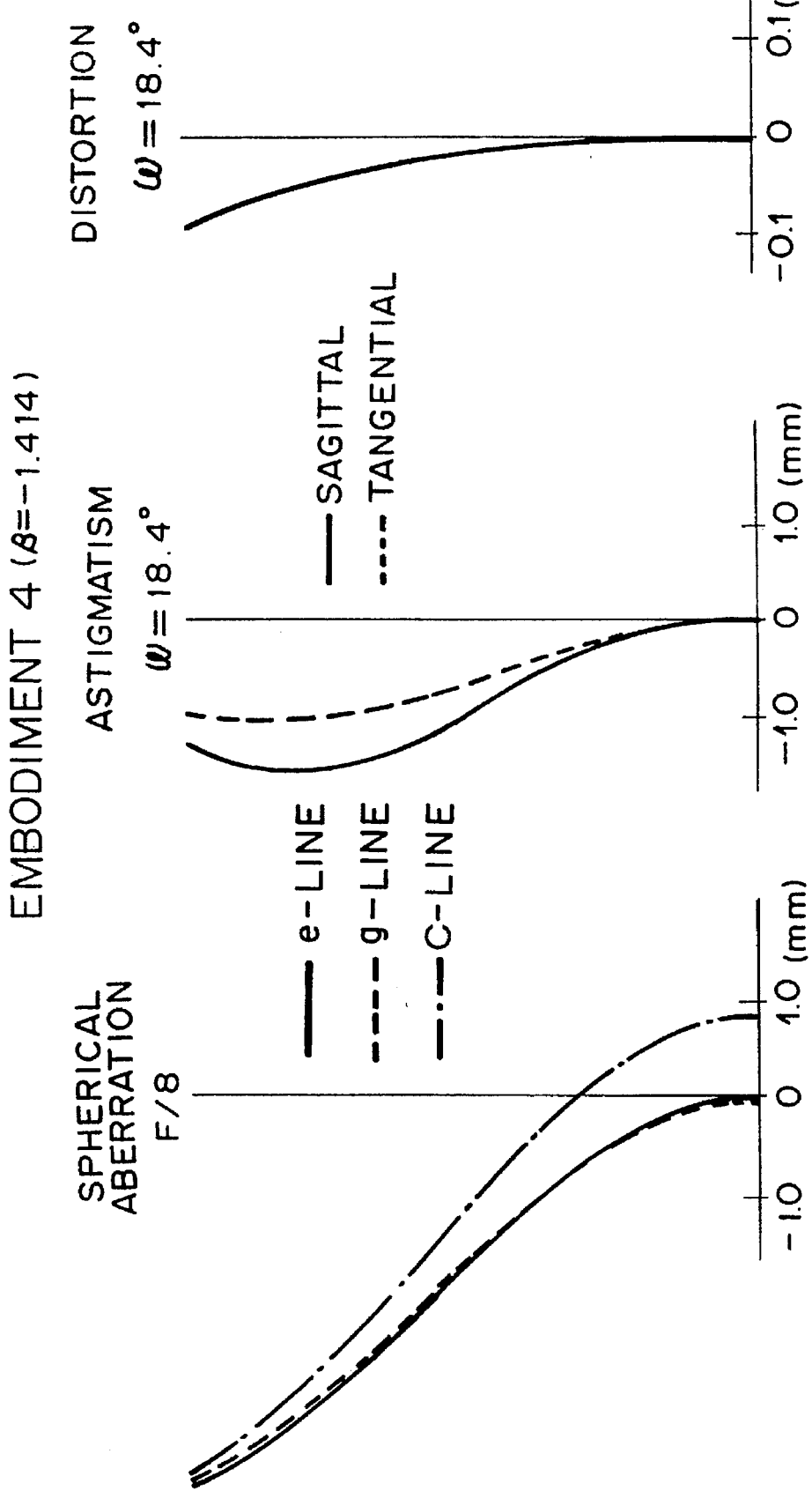

FIG. 12A

SPHERICAL ABERRATION
F/8

— e-LINE
--- g-LINE
-·- C-LINE

FIG. 12B

EMBODIMENT 4 (β = -1.0)

ASTIGMATISM
ω = 21.4°

— SAGITTAL
--- TANGENTIAL

FIG. 12C

DISTORTION
ω = 21.4°

EMBODIMENT 4 (β = −0.707)

FIG. 13A
SPHERICAL ABERRATION
F/8
e-LINE
g-LINE
C-LINE

FIG. 13B
ASTIGMATISM
ω = 18.4°
SAGITTAL
TANGENTIAL

FIG. 13B
DISTORTION
ω = 18.4°

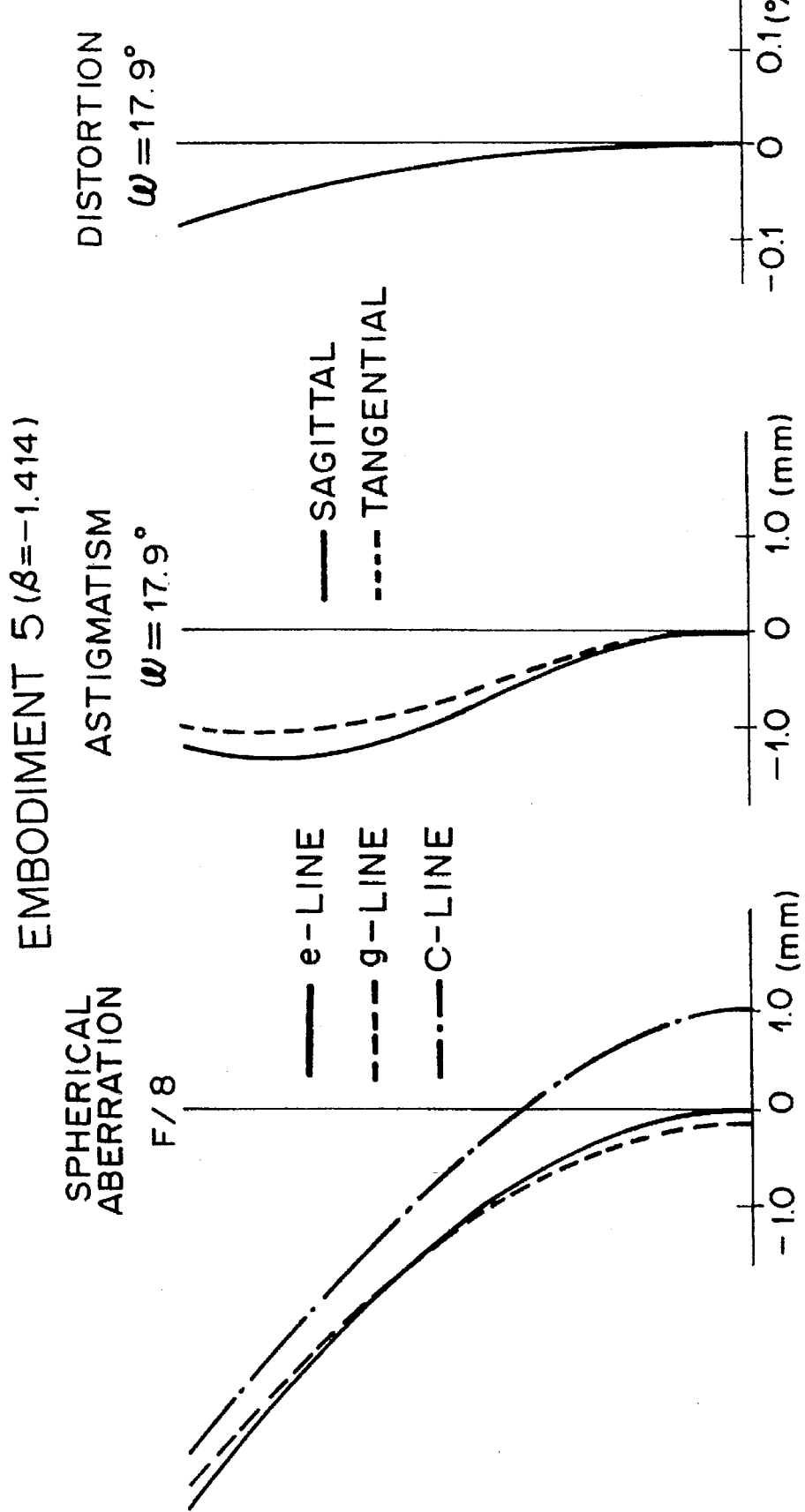

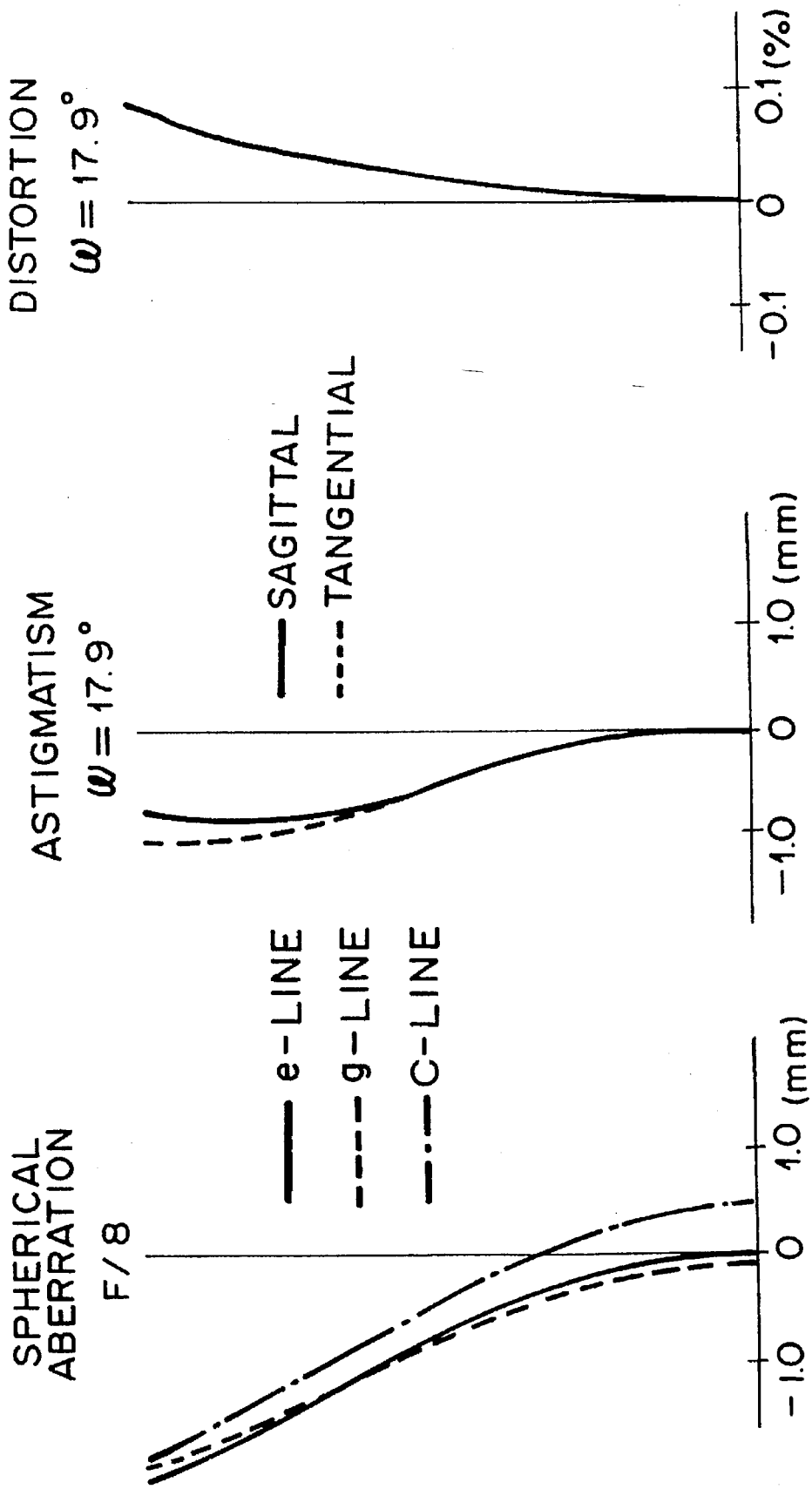

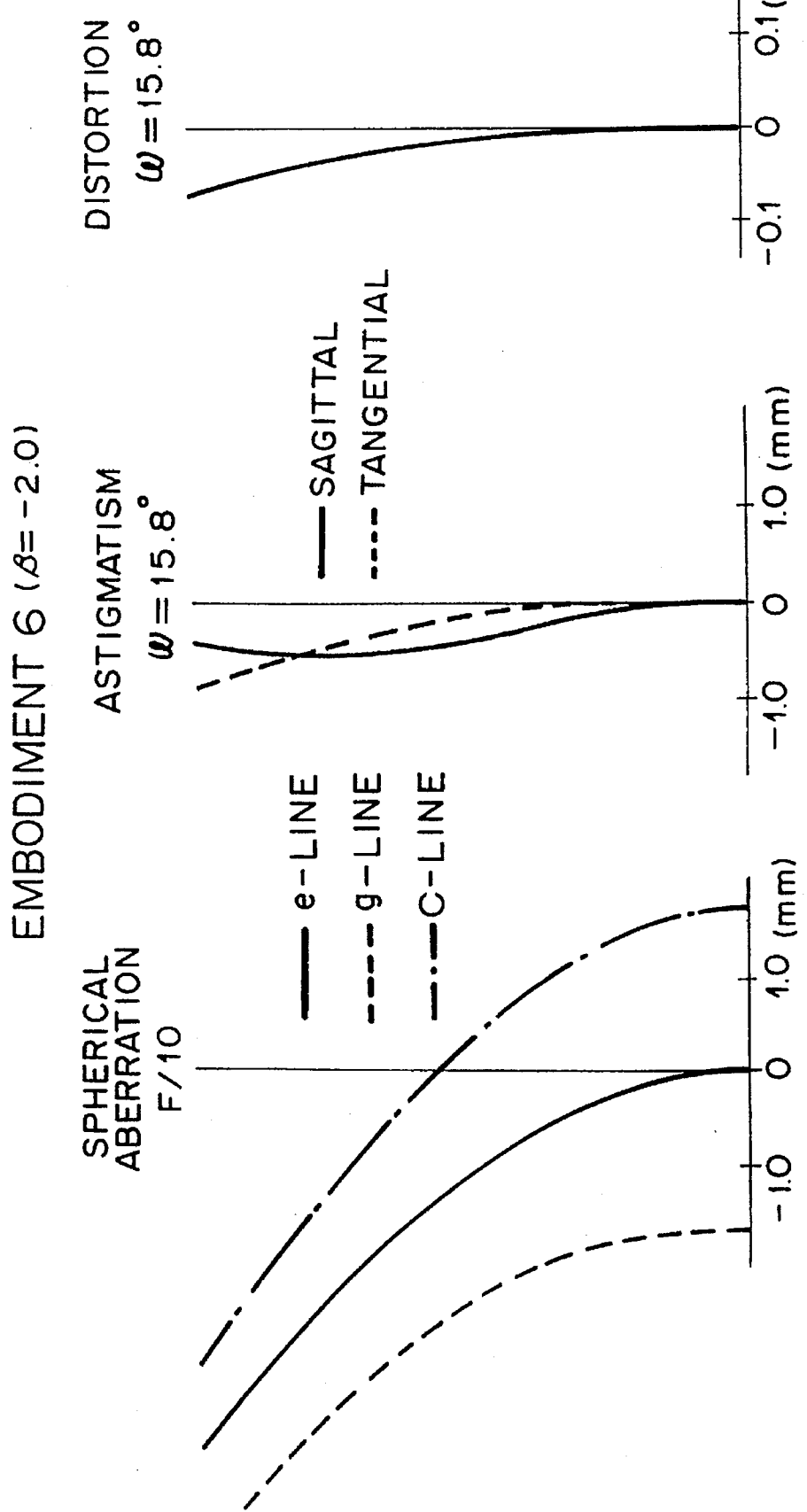

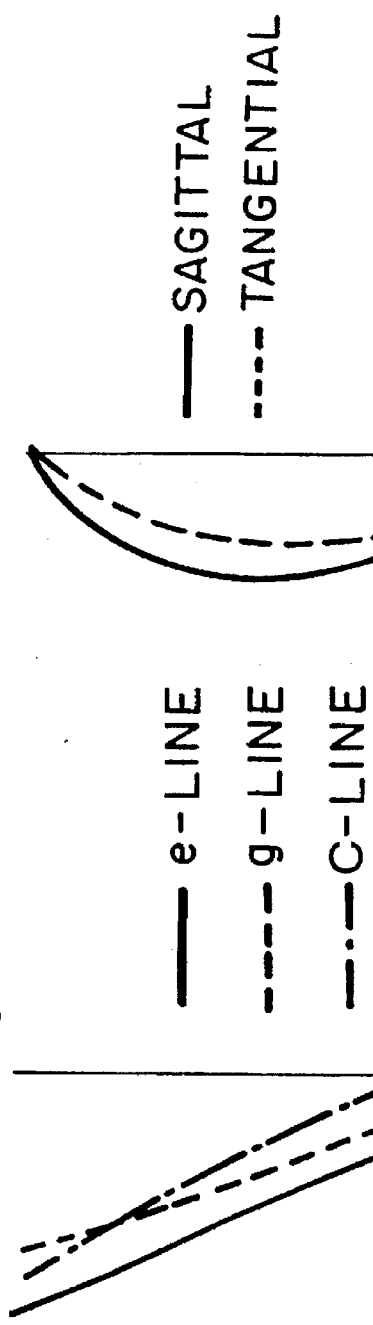

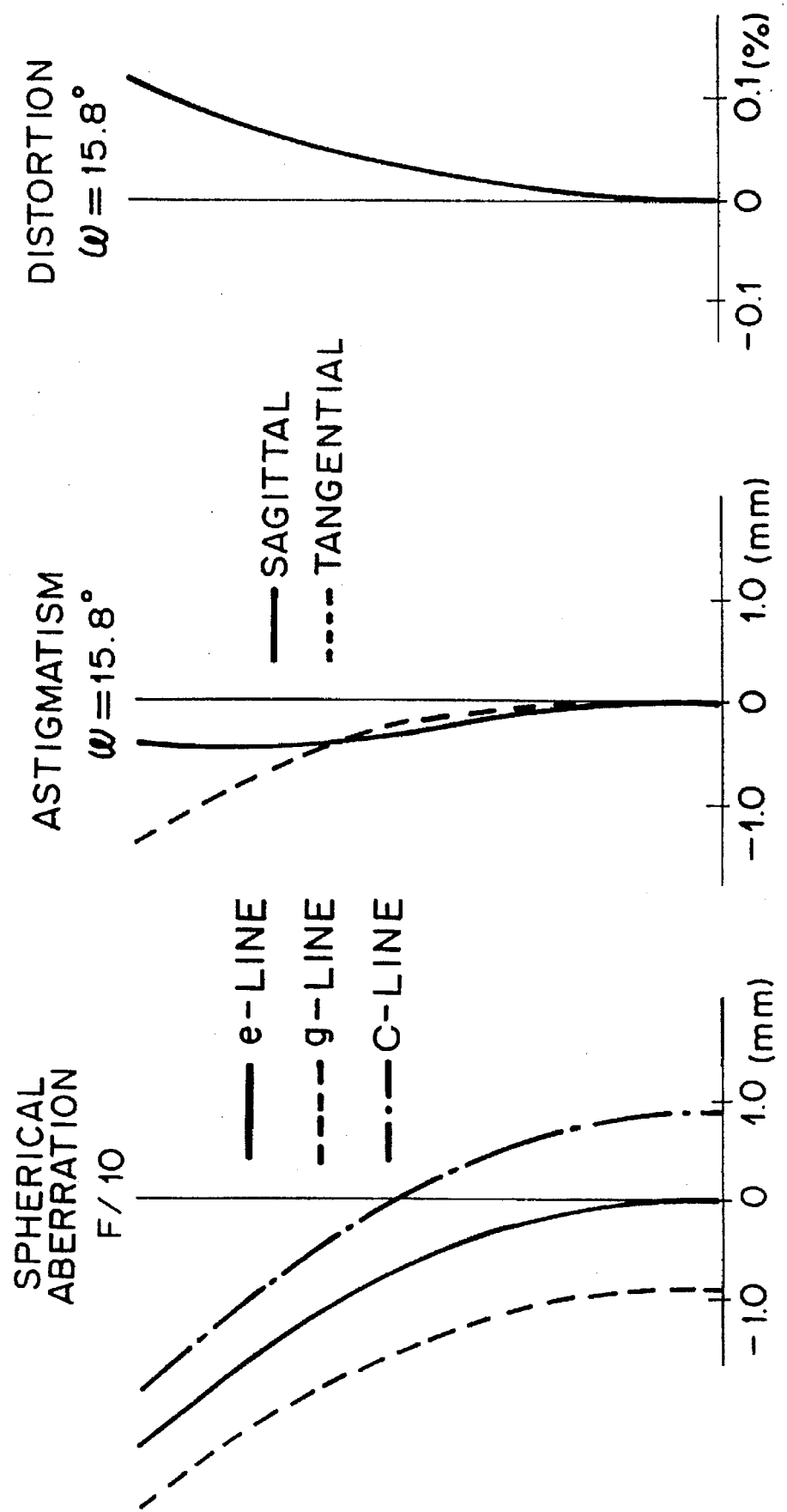

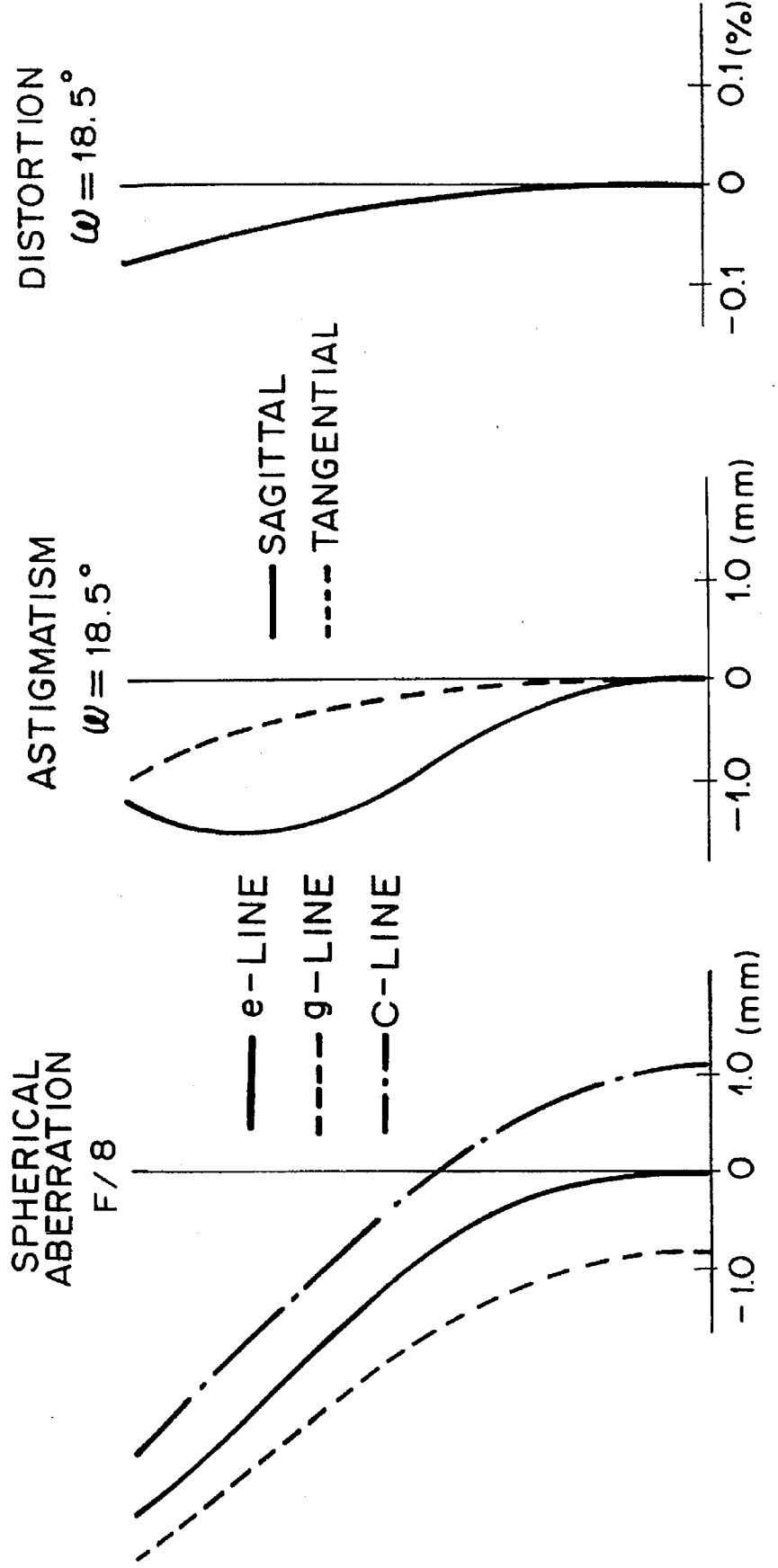

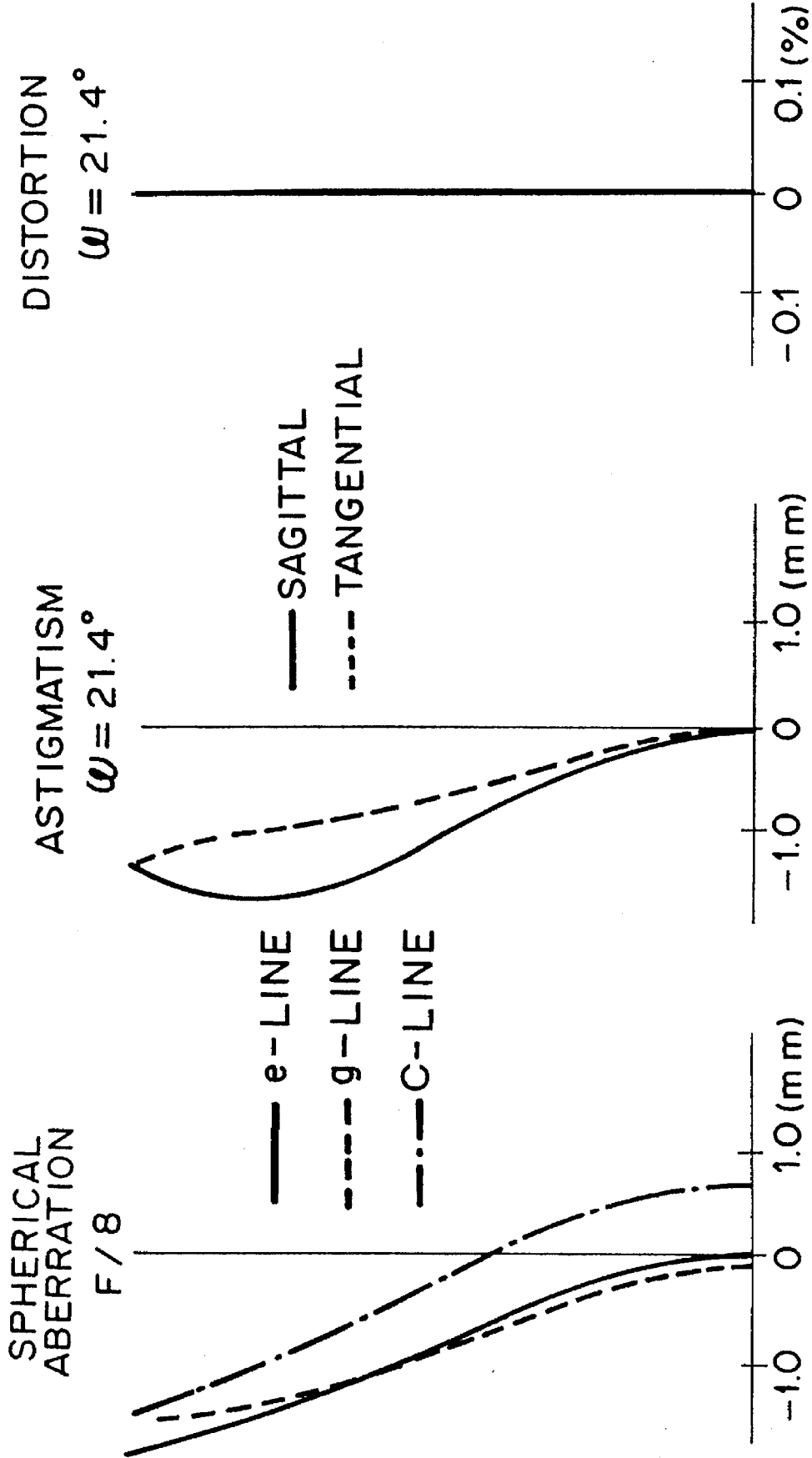

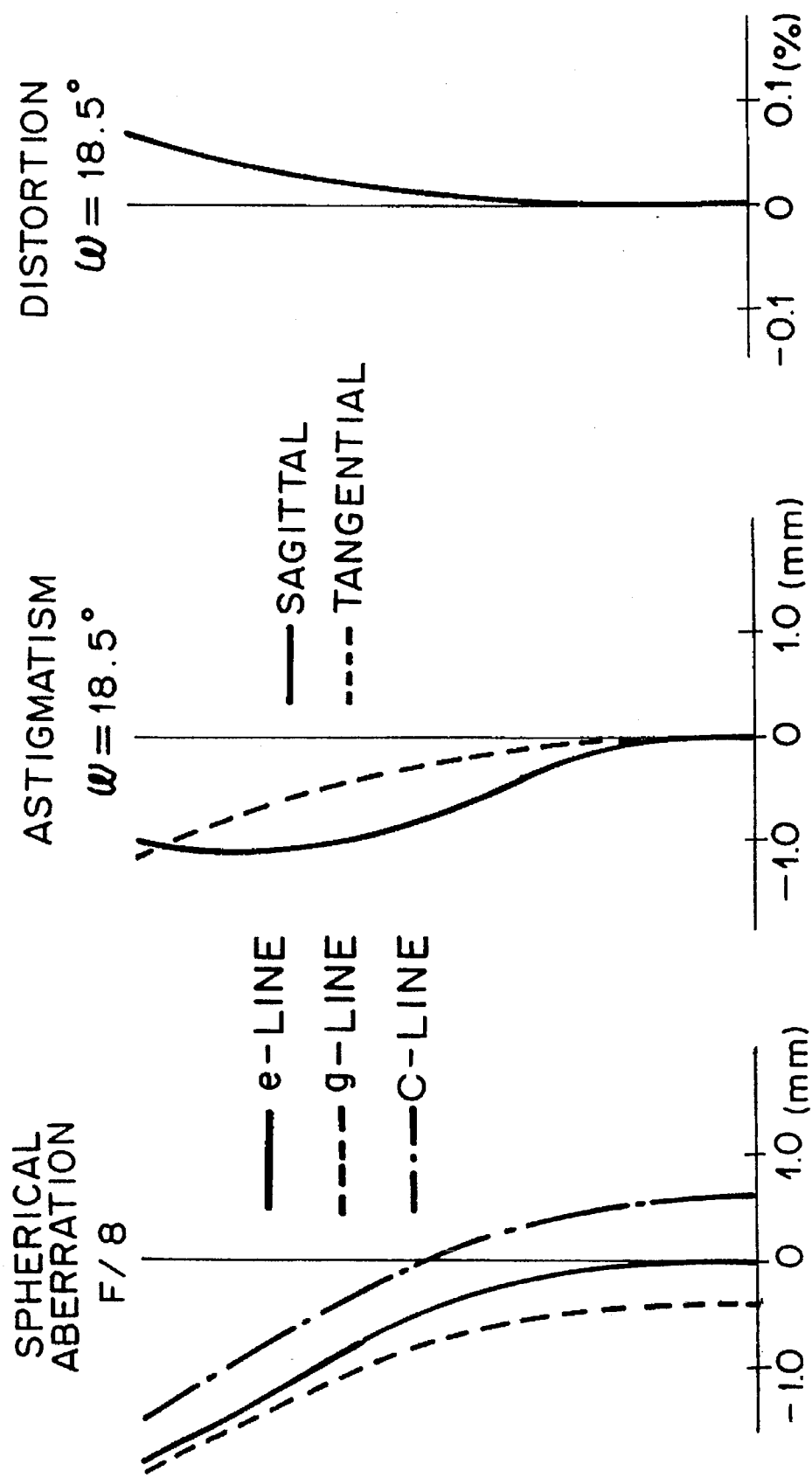

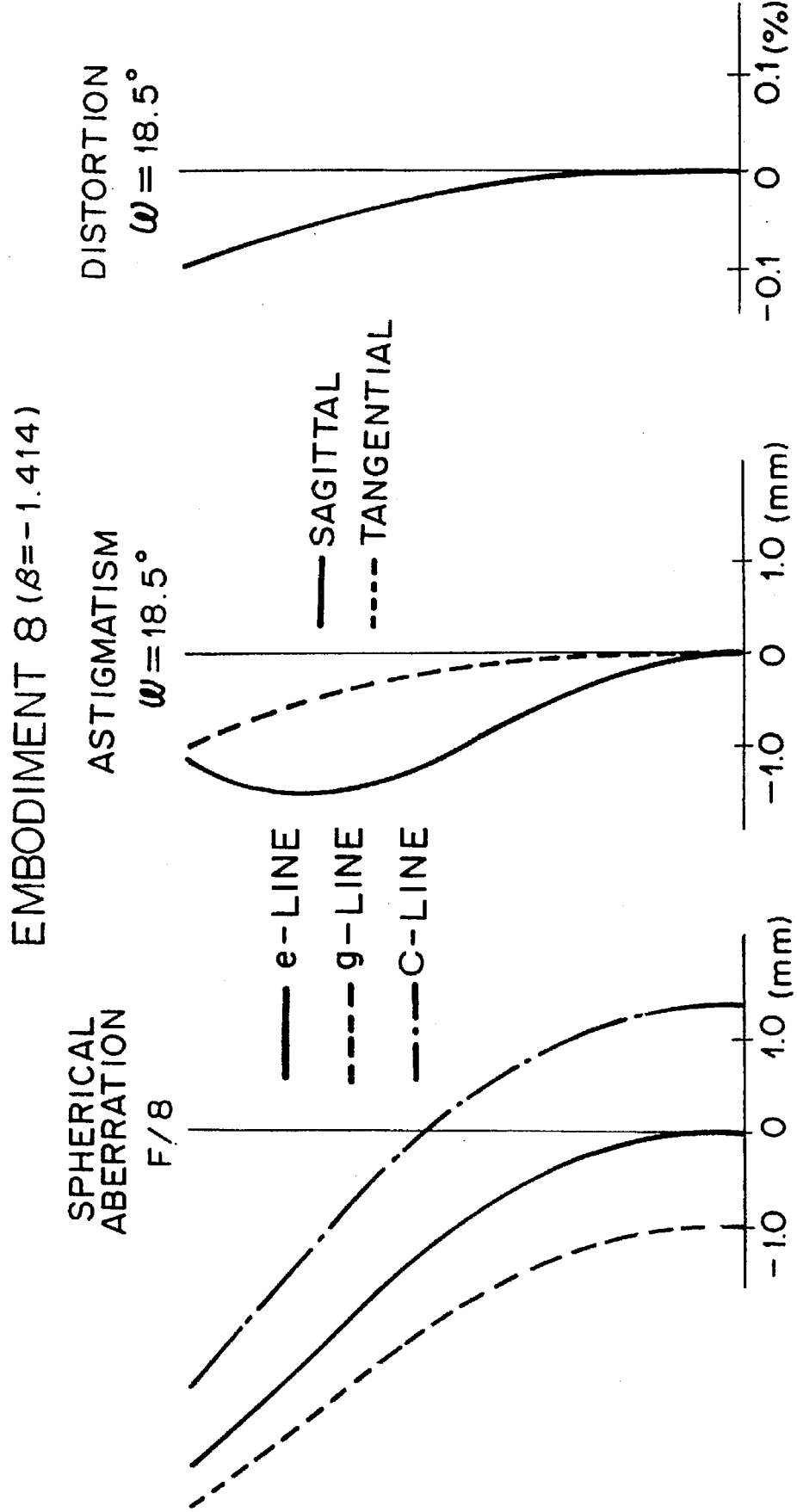

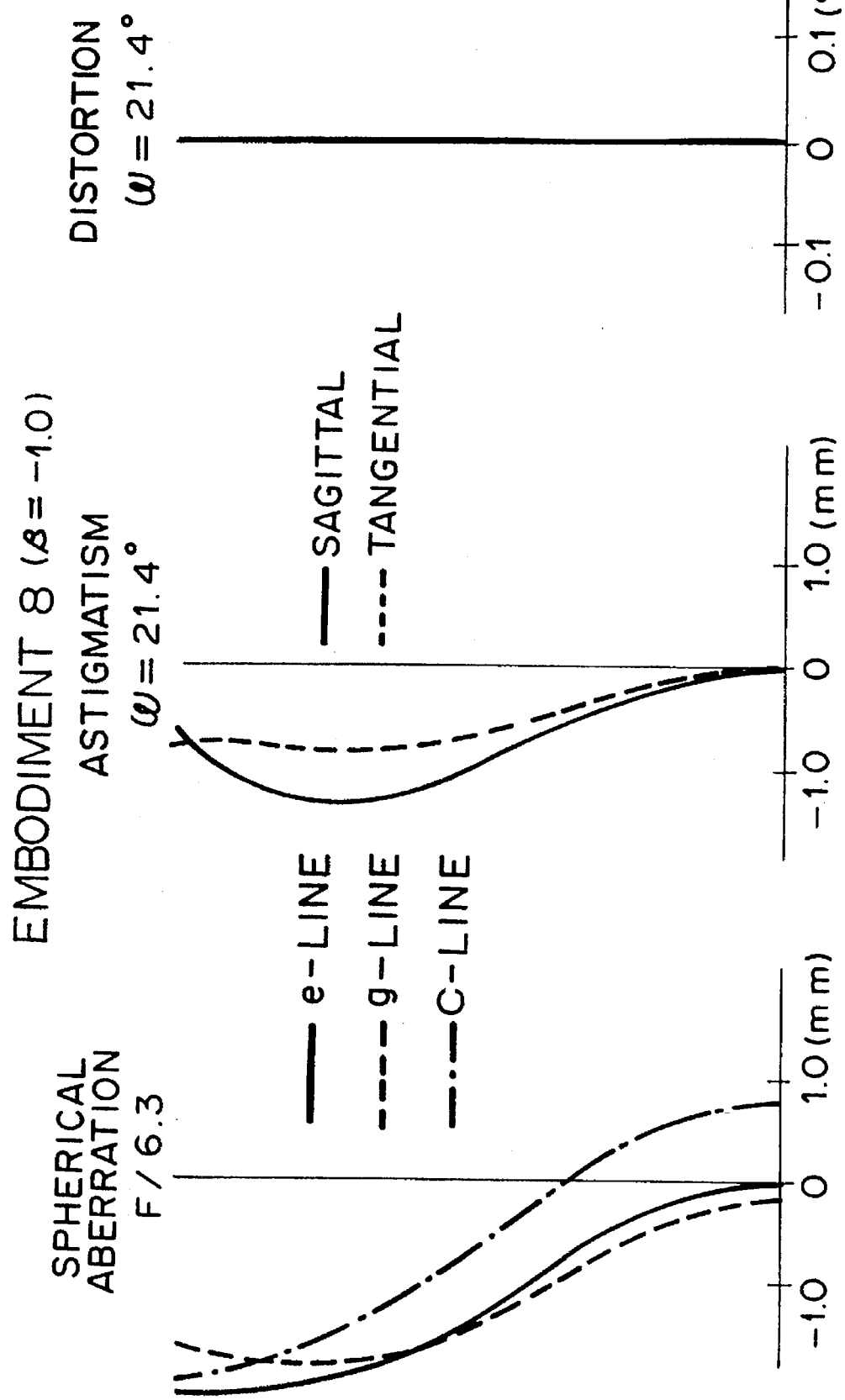

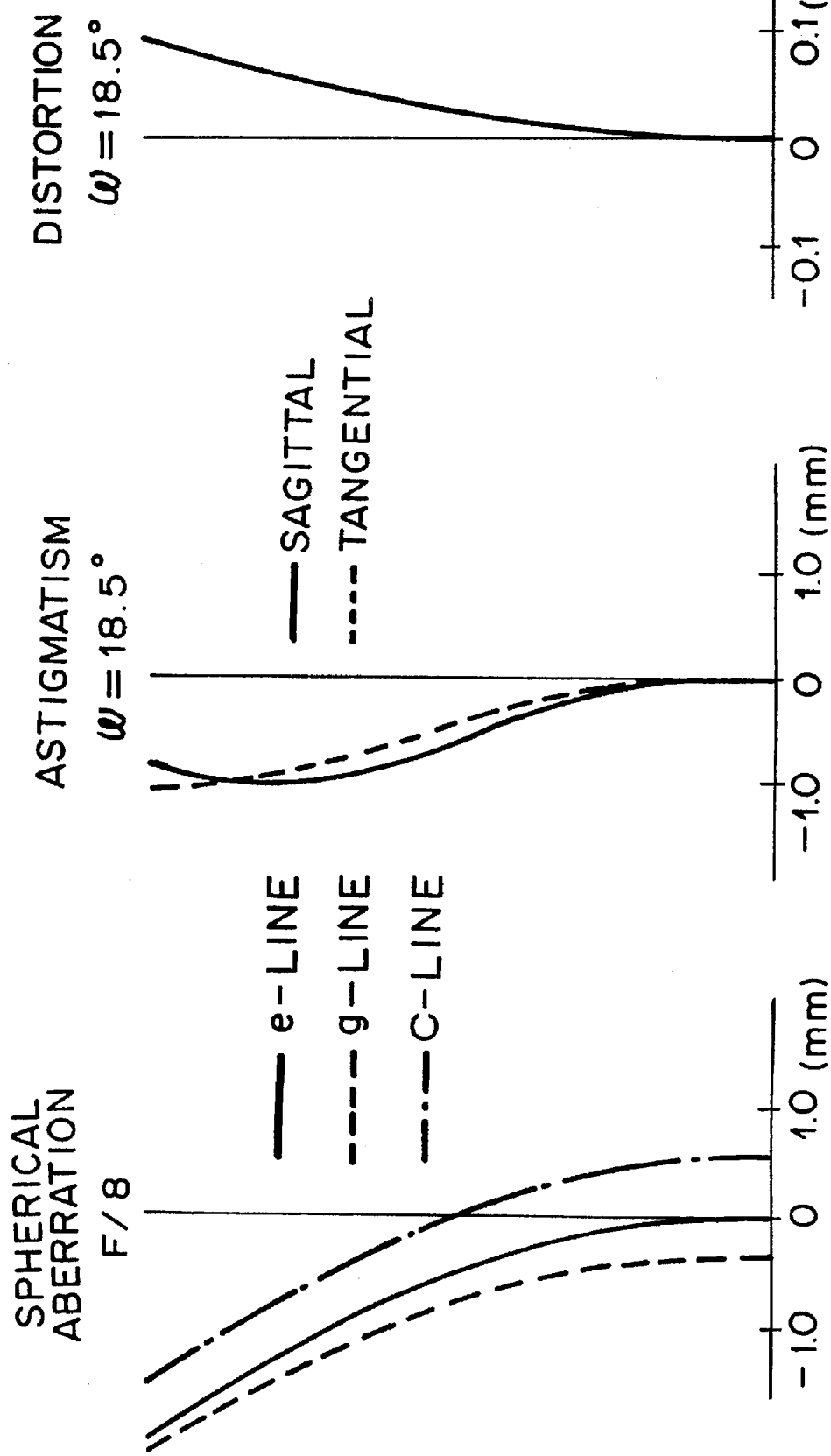

5,671,094

ZOOM LENS SYSTEM IN FINITE CONJUGATE DISTANCE

RELATED APPLICATIONS

This application claims the priority of Japanese Patent Application No. 7-286873 filed on Oct. 6, 1995, which is incorporated herein by reference.

BACKGROUND OF THE INVENTION

1. Field of the Invention

The present invention relates to a zoom lens system in a finite conjugate distance, which is suitable for copying under near real-size magnification in a copying machine, a photomechanical processor, or the like and, in particular, to a zoom lens system composed of four sheets of lenses in which the distance from the object surface to the imaging surface does not change even at the time of variable magnification.

2. Description of the Prior Art

As a zoom lens system suitable for copying under near real-size magnification which is used in a copying machine, a photomechanical processor, or the like, there have conventionally been known zoom lens systems in which the distance from the object surface to the imaging surface does not change even at the time of variable magnification.

As this kind of lenses, those disclosed in Japanese Unexamined Patent Publication No. 62-180317 (Japanese Patent Publication No. 7-1338) and Japanese Unexamined Patent Publication No. 59-61814 have been known.

Of the above-mentioned conventional lenses, however, the former and latter are respectively composed of five and six sheets of lenses, and there has been a demand for a copying zoom lens composed of four sheets of lenses in order to attain a low cost and a compact size.

SUMMARY OF THE INVENTION

In view of such a circumstance, the object of the present invention is to provide a zoom lens system in a finite conjugate distance, in which the distance from the object surface to the imaging surface does not change even at the time of variable magnification, and which is suitable for copying under near real-size magnification, yields a high performance, while attaining a low cost and a compact size.

The zoom lens system in a finite conjugate distance in accordance with the present invention comprises, successively from the object side, a first lens comprising a biconvex lens, a second lens comprising a biconcave lens, a third lens comprising a biconcave lens, and a fourth lens comprising a biconvex lens;

wherein, distance between the first lens and second lens, distance between the third lens and fourth lens, and distance between the second lens and third lens when the imaging magnification is reduced or enlarged are made larger than those under real-size magnification, and wherein the whole system is moved while the distance from the object surface to the imaging surface is held substantially constant when magnification is varied.

Also, more desirably, the zoom lens system is configured so as to satisfy the following conditional expressions (1) to (5):

(1) $0.27 < |f_1|/f < 0.40$ (2) $0.30 < |f_2|/f < 0.44$ (3) $0.40 < (\Delta d_2 + \Delta d_6)/\Delta d_4 < 2.50$ (4) $0.40 < \Delta d_2/\Delta d_6 < 1.10$ (when $|\beta| \geq 1$)

(5) $0.90 < \Delta d_2/\Delta d_6 < 1.70$ (when $|\beta| < 1$)

wherein $f$ is focal length of the whole system when magnification is $-1.0$;

$f_1$ is focal length of the first lens;

$f_2$ is focal length of the second lens;

$\beta$ is magnification;

$\Delta d_2$ is (distance between the first lens and second lens when magnification $\beta$ is $\beta_x$)−(distance between the first lens and second lens when magnification $\beta$ is $-1$);

$\Delta d_4$ is (distance between the second lens and third lens when magnification $\beta$ is $\beta_x$)−(distance between the second lens and third lens when magnification − is −1); and $\Delta d_6$ is (distance between the third lens and fourth lens when magnification $\beta$ is $\beta_x$)−(distance between the third lens and fourth lens when magnification $\beta$ is $-1$).

More specifically, for example, assuming that the lens surfaces are successively counted from the object side, it is desirable that the absolute values of radii of curvature of the first, second, third, and fourth lens surfaces be respectively identical to those of the eighth, seventh, sixth, and fifth lens surfaces, and that the center thickness values of the first and second lenses as well as refractive index values of their materials be respectively identical to those of the fourth and third lenses.

BRIEF DESCRIPTION OF THE DRAWINGS

FIG. 2 is an aberration chart of the lens in accordance with Embodiment 1 ($\beta=-1.224$);

FIG. 4 is an aberration chart of the lens in accordance with Embodiment 1 ($\beta=-0.707$);

FIG. 5 is an aberration chart of the lens in accordance with Embodiment 2 ($\beta=-1.414$);

FIG. 6 is an aberration chart of the lens in accordance with Embodiment 2 ($\beta=-1.0$);

FIG. 7 is an aberration chart of the lens in accordance with Embodiment 2 ($\beta=-0.707$);

FIG. 8 is an aberration chart of the lens in accordance with Embodiment 3 ($\beta=-1.414$);

FIG. 9 is an aberration chart of the lens in accordance with Embodiment 3 ($\beta=-1.0$);

FIG. 10 is an aberration chart of the lens in accordance with Embodiment 3 ($\beta=-0.707$);

FIG. 11 is an aberration chart of the lens in accordance with Embodiment 4 ($\beta=-1.414$);

FIG. 12 is an aberration chart of the lens in accordance with Embodiment 4 ($\beta=-1.0$);

FIG. 13 is an aberration chart of the lens in accordance with Embodiment 4 ($\beta=-0.707$);

FIG. 14 is an aberration chart of the lens in accordance with Embodiment 5 ($\beta=-1.414$);

FIG. 16 is an aberration chart of the lens in accordance with Embodiment 5 ($\beta=-0.707$);

FIG. 17 is an aberration chart of the lens in accordance with Embodiment 6 ($\beta=-2.0$);

FIG. 18 is an aberration chart of the lens in accordance with Embodiment 6 ($\beta=-1.0$);

FIG. 19 is an aberration chart of the lens in accordance with Embodiment 6 ($\beta=-0.5$);

FIG. 20 is an aberration chart of the lens in accordance with Embodiment 7 ($\beta=-1.414$);

FIG. 21 is an aberration chart of the lens in accordance with Embodiment 7 ($\beta=-1.0$);

FIG. 22 is an aberration chart of the lens in accordance with Embodiment 7 ($\beta=-0.707$);

FIG. 23 is an aberration chart of the lens in accordance with Embodiment 8 ($\beta=-1.414$);

FIG. 24 is an aberration chart of the lens in accordance with Embodiment 8 ($\beta=-1.0$); and FIG. 25 is an aberration chart of the lens in accordance with Embodiment 8 ($\beta=-0.707$).

DETAILED DESCRIPTION OF THE PREFERRED EMBODIMENTS

In the following, embodiments of the present invention will be explained with reference to drawings.

Figure 1:
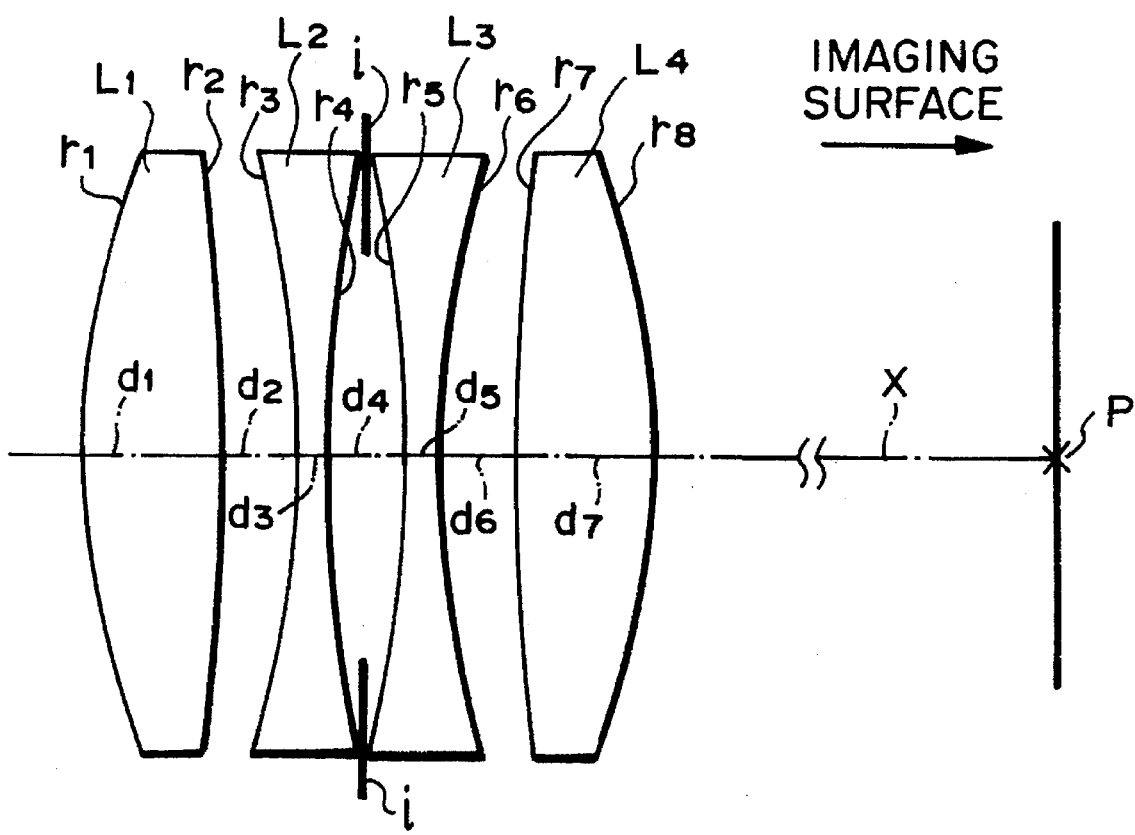
FIG. 1 is a schematic view showing a basic lens configuration in accordance with Embodiments 1 to 8 of the present invention.
Figures 3A, 3B, 3C:
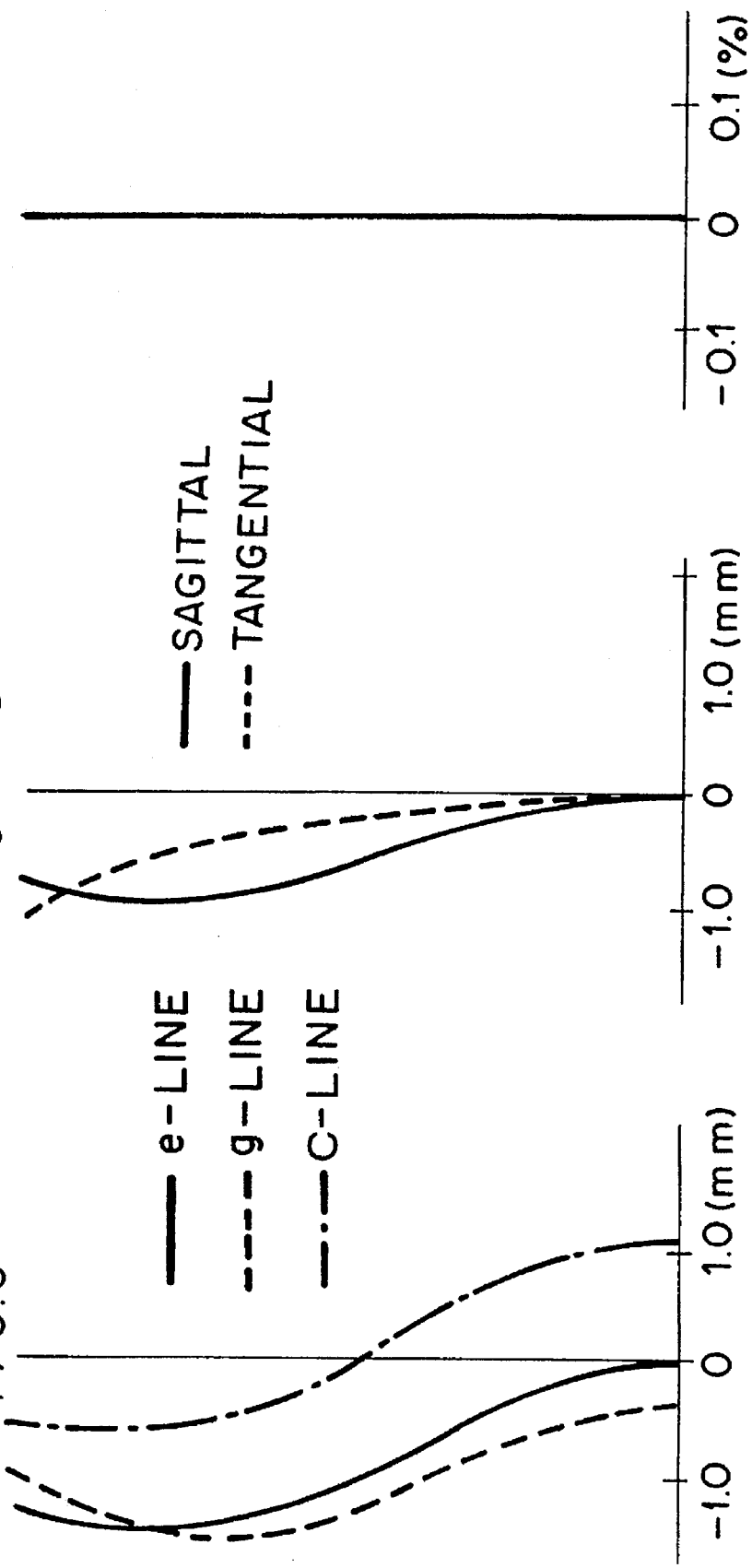
FIG. 3 is an aberration chart of the lens in accordance with Embodiment 1 ($\beta=-1.0$)
Figures 15A, 15B, 15C:
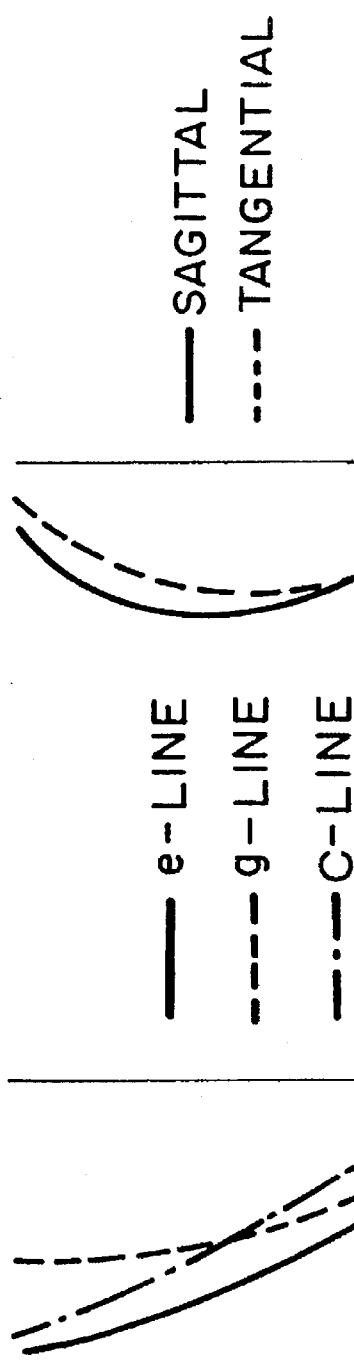
FIG. 15 is an aberration chart of the lens in accordance with Embodiment 5 ($\beta=-1.0$)

Here, FIG. 1 shows a basic lens configuration of Embodiments 1 to 8. As shown in FIG. 1, the lens system in accordance with these embodiments is constituted by four sheets of lenses $L_1$ to $L_4$ which are disposed in pairs symmetrical to each other with respect to a stop i, and a luminous flux incident on the lens system from the object side along an optical axis X forms an image at an imaging position P.

Here, the first lens $L_1$ is a biconvex lens having a surface with a larger curvature directed onto the object side, the second lens $L_2$ is a biconcave lens having a surface with a larger curvature directed onto the imaging surface side (except for Embodiment 1 wherein a surface with a weaker curvature is directed onto the imaging surface side), the third lens $L_3$ is a biconcave lens whose direction is opposite to that of the second lens $L_2$, and the fourth lens $L_4$ is a biconvex lens whose direction is opposite to that of the first lens $L_1$.

Namely, assuming that the lens surfaces are successively counted from the object side, the absolute values of radii of curvature of the first, second, third, and fourth lens surfaces are respectively identical to those of the eighth, seventh, sixth, and fifth lens surfaces. Also, the center thickness values of the first and second lenses as well as their materials (refractive index values) are respectively identical to those of the fourth and third lenses.

Also, this lens system is configured such that distance between the first lens and second lens, distance between the third lens and fourth lens, and distance between the second lens and third lens when the imaging magnification is reduced or enlarged are made larger than those under real-size magnification, whereas the whole system is moved with the distance from the object surface to the imaging surface being held substantially constant when magnification is varied. Also, the lens system is configured so as to satisfy the following conditional expressions (1) to (5):

(1) $0.27<|f_1|/f<0.40$ (2) $0.30<|f_2|/f<0.44$ (3) $0.40<(\Delta d_2+\Delta d_6)\Delta d_4<2.50$ (4) $0.40<\Delta d_2/\Delta d_6<1.10$ (when $|\beta|\geq 1$)

(5) $0.90<\Delta d_2/\Delta d_6<1.70$ (when $|\beta|<1$)

wherein f is focal length of the whole system when magnification is $-1.0$;

$f_1$ is focal length of the first lens;

$f_2$ is focal length of the second lens;

$\beta$ is magnification;

$\Delta d_2$ is (distance between the first lens and second lens when magnification $\beta$ is $\beta_x$)–(distance between the first lens and second lens when magnification $\beta$ is $-1$);

$d_4$ is (distance between the second lens and third lens when magnification $\beta$ is $\beta_x$)–(distance between the second lens and third lens when magnification $\beta$ is $-1$); and $\Delta d_6$ is (distance between the third lens and fourth lens when magnification $\beta$ is $\beta_x$)–(distance between the third lens and fourth lens when magnification $\beta$ is $-1$).

In the following, technical significance of each of the above-mentioned expressions (1) to (5) will be explained. Namely, conditional expressions (1) and (2) have similar significance. Below their lower limits, spherical aberration is corrected too much, while a higher accuracy is required for lens spacing such that it becomes difficult to manufacture the lens system. Above their upper limits, by contrast, spherical aberration is corrected insufficiently, whereby favorable imaging performance may not be obtained.

Below the lower limit of conditional expression (3), the image surface curvature becomes larger on the lens side. Above its upper limit, by contrast, the image surface curvature becomes larger on the side opposite to the lens, whereby a favorable imaging performance may not be obtained in the whole image surface area.

Below the lower limit of conditional expression (4), coma is corrected too much under enlarging magnification, thereby increasing distortion. Above its upper limit, by contrast, coma is corrected insufficiently. In any of these cases, a favorable imaging performance may not be obtained.

Below the lower limit of conditional expression (5), coma is corrected insufficiently under reducing magnification. Above its upper limit, by contrast, coma is corrected too much, while distortion is increased. As a result, in any of these cases, a favorable imaging performance may not be obtained.

In the following, Embodiments 1 to 8 will be explained with reference to their specific values.

Embodiment 1

Table 1 (follows) shows radius of curvature r (mm) of each lens surface, center thickness of each lens and air gap between neighboring lenses d (mm)(wherein imaging magnification $\beta=-1.0$; whereas the cases of $\beta=-1.224$ and $\beta=-0.707$ are also shown for variable distances $d_2$, $d_4$, and $d_6$), and refractive index N and Abbe number $\nu$ of each lens at d-line in Embodiment 1.

Also, the middle portion of Table 1 shows the respective values of focal length f (wherein imaging magnification $\beta=-1.0$), F number, and half field angle $\omega$ (wherein $\beta=-1.224$, $\beta=-1.0$, and $\beta=-0.707$) of the whole lens system in accordance with this embodiment.

Further, the lower portion of Table 1 shows values respectively corresponding to the above-mentioned conditional expressions (1) to (5) in this embodiment. Embodiment 2

Table 2 (follows) shows radius of curvature r (mm) of each lens surface, center thickness of each lens and air gap between neighboring lenses d (mm)(wherein imaging magnification $\beta=-1.0$; whereas the cases of $\beta=-1.414$ and $\beta=-0.707$ are also shown for variable distances $d_2$, $d_4$, and $d_6$), and refractive index N and Abbe number $\nu$ of each lens at d-line in Embodiment 2.

Also, the middle portion of Table 2 shows the respective values of focal length f (wherein imaging magnification $\beta=-1.0$), F number, and half field angle $\omega$(wherein $\beta=-1.414$, $\beta=-1.0$, and $\beta=-0.707$) of the whole lens system in accordance with this embodiment.

Further, the lower portion of Table 2 shows values respectively corresponding to the above-mentioned conditional expressions (1) to (5) in this embodiment.

Embodiment 3

Table 3 (follows) shows radius of curvature r (mm) of each lens surface, center thickness of each lens and air gap between neighboring lenses d (mm)(wherein imaging magnification $\beta=-1.0$; whereas the cases of $\beta=-1.414$ and $\beta=-0.707$ are also shown for variable distances $d_2$, $d_4$, and $d_6$), and refractive index N and Abbe number $\nu$ of each lens at d- line in Embodiment 3.

Also, the middle portion of Table 3 shows the respective values of focal length f (wherein imaging magnification $\beta=-1.0$), F number, and half field angle 107 (wherein $\beta=-1.414$, $\beta=-1.0$, and $\beta=-0.707$) of the whole lens system in accordance with this embodiment.

Further, the lower portion of Table 3 shows values respectively corresponding to the above-mentioned conditional expressions (1) to (5) in this embodiment.

Embodiment 4

Table 4 (follows) shows radius of curvature r (mm) of each lens surface, center thickness of each lens and air gap between neighboring lenses d (mm)(wherein imaging magnification $\beta=-1.0$; whereas the cases of $\beta=-1.414$ and $\beta=-0.707$ are also shown for variable distances $d_2$, $d_4$, and $d_6$), and refractive index N and Abbe number $\nu$ of each lens at d-line in Embodiment 4.

Also, the middle portion of Table 4 shows the respective values of focal length f (wherein imaging magnification $\beta=-1.0$), F number, and haft field angle $\omega$(wherein $\beta=-1.414$, $\beta=-1.0$, and $\beta=-0.707$) of the whole lens system in accordance with this embodiment.

Further, the lower portion of Table 4 shows values respectively corresponding to the above-mentioned conditional expressions (1) to (5) in this embodiment.

Embodiment 5

Table 5 (follows) shows radius of curvature r (mm) of each lens surface center thickness of each lens and air gap between neighboring lenses d (mm)(wherein imaging magnification $\beta=-1.0$; whereas the cases of $\beta=-1.414$ and $\beta=-0.707$ are also shown for variable distances $d_2$, $d_4$, and $d_6$), and refractive index N and Abbe number $\nu$ of each lens at d- line in Embodiment 5.

Also, the middle portion of Table 5 shows the respective values of focal length f (wherein imaging magnification $\beta=-1.0$), F number, and half field angle $\omega$(wherein $\beta=-1.414$, $\beta=-1.0$, and $\beta=-0.707$) of the whole lens system in accordance with this embodiment.

Further, the lower portion of Table 5 shows values respectively corresponding to the above-mentioned conditional expressions (1) to (5) in this embodiment.

Embodiment 6

Table 6 (follows) shows radius of curvature r (mm) of each lens surface, center thickness of each lens and air gap between neighboring lenses d (mm)(wherein imaging magnification $\beta=-1.0$; whereas the cases of $\beta=-2.0$ and $\beta=-0.5$ are also shown for variable distances $d_2$, $d_4$, and $d_6$), and refractive index N and Abbe number $\nu$ of each lens at d-line in Embodiment 6.

Also, the middle portion of Table 6 shows the respective values of focal length f (wherein imaging magnification $\beta=-1.0$), F number, and half field angle $\omega$(wherein $\beta=-2.0$, $\beta=-1.0$, and $\beta=-0.5$) of the whole lens system in accordance with this embodiment.

Further, the lower portion of Table 6 shows values respectively corresponding to the above-mentioned conditional expressions (1) to (5) in this embodiment.

Embodiment 7

Table 7 (follows) shows radius of curvature r (mm) of each lens surface, center thickness of each lens and air gap between neighboring lenses d (mm)(wherein imaging magnification $\beta=-1.0$; whereas the cases of $\beta=-1.414$ and $\beta=-0.707$ are also shown for variable distances $d_2$, $d_4$, and $d_6$), and refractive index N and Abbe number $\nu$ of each lens at d- line in Embodiment 7.

Also, the middle portion of Table 7 shows the respective values of focal length f (wherein imaging magnification $\beta=-1.0$), F number, and half field angle $\omega$(wherein $\beta=-1.414$, $\beta=-1.0$, and $\beta=-0.707$) of the whole lens system in accordance with this embodiment.

Further, the lower portion of Table 7 shows values respectively corresponding to the above-mentioned conditional expressions (1) to (5) in this embodiment.

Embodiment 8

Table 8 (follows) shows radius of curvature r (mm) of each lens surface, center thickness of each lens and air gap between neighboring lenses d (mm)(wherein imaging magnification $\beta=-1.0$; whereas the cases of $\beta=-1.414$ and $\beta=-0.707$ are also shown for variable distances $d_2$, $d_4$, and $d_6$), and refractive index N and Abbe number $\nu$ of each lens at d-line in Embodiment 8.

Also, the middle portion of Table 8 shows the respective values of focal length f (wherein imaging magnification $\beta=-1.0$), F number, and half field angle $\omega$(wherein $\beta=-1.414$, $\beta=-1.0$, and $\beta=-0.707$) of the whole lens system in accordance with this embodiment.

Further, the lower portion of Table 8 shows values respectively corresponding to the above-mentioned conditional expressions (1) to (5) in this embodiment.

FIGS. 2 to 25 show aberration charts of Embodiments 1 to 8 (with three $\beta$ values for each embodiment).

As can be seen from these charts, in accordance with these embodiments, various kinds of aberration can be made favorable not only at the time of real-size magnification but also at the time of enlarging and reducing.

Without being restricted to the foregoing embodiments, the lens system of the present invention can be modified in various manners. For example, the radius of curvature r and lens spacing (or lens thickness) d in each of four sheets of lenses can be appropriately changed.

As explained in the foregoing, in the zoom lens system in a finite conjugate distance in accordance with the present invention, positive, negative, negative, and positive lenses are successively disposed from the object side and, at the time of reducing and enlarging, the whole lens system is moved with the distance from the object surface to the imaging surface being held constant, while the distances between the constitutional lenses are changed so as to become larger than those at the time of real-size magnification. Accordingly, a high-performance zoom lens system suitable for copying under near real-size magnification, which can favorably correct various kinds of aberration, while being composed of four sheets of lenses, is formed.

Therefore, as compared with conventional lens systems, a lower manufacturing cost and a more compact size in the whole lens system can be attained.

TABLE 1

| Surface No. | r | d β = −1.224 | d β = −1.0 | d β = −0.707 | N | ν |
|---|---|---|---|---|---|---|
| 1 | 31.264 | | 5.391 | | 1.62041 | 60.3 |
| 2 | −89.946 | 2.955 | 2.868 | 3.366 | | |
| 3 | −42.155 | | 1.332 | | 1.53256 | 46.0 |
| 4 | 47.505 | 2.793 | 2.604 | 2.966 | | |
| 5 | −47.505 | | 1.332 | | 1.53256 | 46.0 |
| 6 | 42.155 | 3.064 | 2.868 | 3.205 | | |
| 7 | 89.946 | | 5.391 | | 1.62041 | 60.3 |
| 8 | −31.264 | | | | | |

$f = 100$ ($\beta = -1.0$), F/NO = 5.6
Half field angle $\omega = 16.0°$ ($\beta = -1.224$)
Half field angle $\omega = 17.5°$ ($\beta = -1.0$)
Half field angle $\omega = 15.1°$ ($\beta = -0.707$)
Values of expression
$|f_1|/f = 0.380$
$|f_2|/f = 0.417$
$(\Delta d_2 + \Delta d_6)/\Delta d_4 = 1.494$ ($\beta = -1.224$)
$(\Delta d_2 + \Delta d_6)/\Delta d_4 = 2.303$ ($\beta = -0.707$)
$(\Delta d_2/\Delta d_6) = 0.441$ ($\beta = -1.224$)
$(\Delta d_2/\Delta d_6) = 1.479$ ($\beta = -0.707$)

TABLE 2

| Surface No. | r | d β = −1.414 | d β = −1.0 | d β = −0.707 | N | ν |
|---|---|---|---|---|---|---|
| 1 | 27.810 | | 5.008 | | 1.62280 | 56.9 |
| 2 | −58.097 | 1.335 | 1.114 | 1.390 | | |
| 3 | −38.526 | | 1.168 | | 1.54869 | 45.4 |
| 4 | 34.756 | 4.239 | 3.075 | 4.075 | | |
| 5 | −34.756 | | 1.168 | | 1.54869 | 45.4 |
| 6 | 38.526 | 1.395 | 1.114 | 1.334 | | |
| 7 | 58.097 | | 5.008 | | 1.62280 | 56.9 |
| 8 | −27.810 | | | | | |

$f = 100$ ($\beta = -1.0$), F/NO = 8
Half field angle $\omega = 19.0°$ ($\beta = -1.414$)
Half field angle $\omega = 22.0°$ ($\beta = -1.0$)
Half field angle $\omega = 19.0°$ ($\beta = -0.707$)
Values of expression
$|f_1|/f = 0.309$
$|f_2|/f = 0.331$
$(\Delta d_2 + \Delta d_6)/\Delta d_4 = 0.431$ ($\beta = -1.414$)
$(\Delta d_2 + \Delta d_6)/\Delta d_4 = 0.496$ ($\beta = -0.707$)
$(\Delta d_2/\Delta d_6) = 0.788$ ($\beta = -1.414$)
$(\Delta d_2/\Delta d_6) = 1.251$ ($\beta = -0.707$)

TABLE 3

| Surface No. | r | d β = −1.414 | d β = −1.0 | d β = −0.707 | N | ν |
|---|---|---|---|---|---|---|
| 1 | 26.574 | | 3.945 | | 1.62299 | 58.1 |
| 2 | −57.470 | 1.331 | 1.107 | 1.328 | | |
| 3 | −38.161 | | 1.813 | | 1.54072 | 47.2 |
| 4 | 31.521 | 3.423 | 2.404 | 3.227 | | |
| 5 | −31.521 | | 1.813 | | 1.54072 | 47.2 |
| 6 | 38.161 | 1.331 | 1.107 | 1.328 | | |
| 7 | 57.470 | | 3.945 | | 1.62299 | 58.1 |
| 8 | −26.574 | | | | | |

$f = 100$ ($\beta = -1.0$), F/NO = 8
Half field angle $\omega = 16.8°$ ($\beta = -1.414$)
Half field angle $\omega = 19.5°$ ($\beta = -1.0$)
Half field angle $\omega = 16.8°$ ($\beta = -0.707$)
Values of expression
$|f_1|/f = 0.297$
$|f_2|/f = 0.316$
$(\Delta d_2 + \Delta d_6)/\Delta d_4 = 0.439$ ($\beta = -1.414$)
$(\Delta d_2 + \Delta d_6)/\Delta d_4 = 0.536$ ($\beta = -0.707$)

TABLE 3-continued

| Surface No. | r | d β = −1.414 | d β = −1.0 | d β = −0.707 | N | ν |
|---|---|---|---|---|---|---|

$(\Delta d_2/\Delta d_6) = 1.0$ ($\beta = -1.414$)
$(\Delta d_2/\Delta d_6) = 1.0$ ($\beta = -0.707$)

TABLE 4

| Surface No. | r | d β = −1.414 | d β = −1.0 | d β = −0.707 | N | ν |
|---|---|---|---|---|---|---|
| 1 | 24.433 | | 2.896 | | 1.62299 | 58.1 |
| 2 | −66.338 | 1.280 | 1.116 | 1.355 | | |
| 3 | −39.739 | | 0.895 | | 1.54072 | 47.2 |
| 4 | 29.768 | 3.911 | 3.265 | 3.791 | | |
| 5 | −29.768 | | 0.895 | | 1.54072 | 47.2 |
| 6 | 39.739 | 1.358 | 1.116 | 1.280 | | |
| 7 | 66.338 | | 2.896 | | 1.62299 | 58.1 |
| 8 | −24.433 | | | | | |

$f = 100$ ($\beta = -1.0$), F/NO = 8
Half field angle $\omega = 18.4°$ ($\beta = -1.414$)
Half field angle $\omega = 21.4°$ ($\beta = -1.0$)
Half field angle $\omega = 18.4°$ ($\beta = -0.707$)
Values of expression
$|f_1|/f = 0.290$
$|f_2|/f = 0.313$
$(\Delta d_2 + \Delta d_6)/\Delta d_4 = 0.628$ ($\beta = -1.414$)
$(\Delta d_2 + \Delta d_6)/\Delta d_4 = 0.765$ ($\beta = -0.707$)
$(\Delta d_2/\Delta d_6) = 0.678$ ($\beta = -1.414$)
$(\Delta d_2/\Delta d_6) = 1.456$ ($\beta = -0.707$)

TABLE 5

| Surface No. | r | d β = −1.414 | d β = −1.0 | d β = −0.707 | N | ν |
|---|---|---|---|---|---|---|
| 1 | 24.148 | | 2.946 | | 1.62299 | 58.1 |
| 2 | −69.583 | 1.338 | 1.182 | 1.425 | | |
| 3 | −39.730 | | 0.882 | | 1.54072 | 47.2 |
| 4 | 29.835 | 3.215 | 2.752 | 3.096 | | |
| 5 | −29.835 | | 0.882 | | 1.54072 | 47.2 |
| 6 | 39.730 | 1.428 | 1.182 | 1.338 | | |
| 7 | 69.583 | | 2.946 | | 1.62299 | 58.1 |
| 8 | −24.148 | | | | | |

$f = 100$ ($\beta = -1.0$), F/NO = 8
Half field angle $\omega = 17.9°$ ($\beta = -1.414$)
Half field angle $\omega = 20.7°$ ($\beta = -1.0$)
Half field angle $\omega = 17.9°$ ($\beta = -0.707$)
Values of expression
$|f_1|/f = 0.291$
$|f_2|/f = 0.314$
$(\Delta d_2 + \Delta d_6)/\Delta d_4 = 0.869$ ($\beta = -1.414$)
$(\Delta d_2 + \Delta d_6)/\Delta d_4 = 1.158$ ($\beta = -0.707$)
$(\Delta d_2/\Delta d_6) = 0.632$ ($\beta = -1.414$)
$(\Delta d_2/\Delta d_6) = 1.552$ ($\beta = -0.707$)

TABLE 6

| Surface No. | r | d β = −2.0 | d β = −1.0 | d β = −0.5 | N | ν |
|---|---|---|---|---|---|---|
| 1 | 23.404 | | 2.234 | | 1.62299 | 58.1 |
| 2 | −75.154 | 2.210 | 1.370 | 2.201 | | |
| 3 | −39.957 | | 0.846 | | 1.54072 | 47.2 |
| 4 | 29.389 | 4.621 | 3.009 | 4.281 | | |
| 5 | −29.389 | | 0.846 | | 1.54072 | 47.2 |
| 6 | 39.957 | 2.210 | 1.370 | 2.201 | | |
| 7 | 75.154 | | 2.234 | | 1.62299 | 58.1 |
| 8 | −23.404 | | | | | |

$f = 100$ ($\beta = -1.0$), F/NO = 10
Half field angle $\omega = 15.8°$ ($\beta = -2.0$)
Half field angle $\omega = 20.7°$ ($\beta = -1.0$)

TABLE 6-continued

| Surface No. | r | $\beta = -2.0$ | d $\beta = -1.0$ | $\beta = -0.5$ | N | ν |
|---|---|---|---|---|---|---|

Half field angle ω = 15.8° (β = −0.5)
Values of expression
$|f_1|/f = 0.289$
$|f_2|/f = 0.312$
$(\Delta d_2 + \Delta d_6)/\Delta d_4 = 1.042$ (β = −2.0)
$(\Delta d_2 + \Delta d_6)/\Delta d_4 = 1.310$ (β = −0.5)
$(\Delta d_2/\Delta d_6) = 1.0$ (β = −2.0)
$(\Delta d_2/\Delta d_6) = 1.0$ (β = −0.5)

TABLE 7

| Surface No. | r | $\beta = -1.414$ | d $\beta = -1.0$ | $\beta = -0.707$ | N | ν |
|---|---|---|---|---|---|---|
| 1 | 26.912 |  | 5.044 |  | 1.60311 | 60.7 |
| 2 | −55.789 | 1.354 | 1.136 | 1.406 |  |  |
| 3 | −36.805 |  | 1.083 |  | 1.53172 | 48.9 |
| 4 | 33.792 | 3.667 | 2.599 | 3.511 |  |  |
| 5 | −33.792 |  | 1.083 |  | 1.53172 | 48.9 |
| 6 | 36.805 | 1.411 | 1.136 | 1.353 |  |  |
| 7 | 55.789 |  | 5.044 |  | 1.60311 | 60.7 |
| 8 | −26.912 |  |  |  |  |  | f = 100 (β = −1.0), F/NO = 8
Half field angle ω = 18.5° (β = −1.414)
Half field angle ω = 21.4° (β = −1.0)
Half field angle ω = 18.5° (β = −0.707)
Values of expression
$|f_1|/f = 0.308$
$|f_2|/f = 0.330$
$(\Delta d_2 + \Delta d_6)/\Delta d_4 = 0.462$ (β = −1.414)
$(\Delta d_2 + \Delta d_6)/\Delta d_4 = 0.535$ (β = −0.707)
$(\Delta d_2/\Delta d_6) = 0.792$ (β = −1.414)
$(\Delta d_2/\Delta d_6) = 1.245$ (β = −0.707)

TABLE 8

| Surface No. | r | $\beta = -1.414$ | d $\beta = -1.0$ | $\beta = -0.707$ | N | ν |
|---|---|---|---|---|---|---|
| 1 | 28.153 |  | 4.323 |  | 1.65844 | 50.8 |
| 2 | −70.856 | 1.473 | 1.267 | 1.551 |  |  |
| 3 | −43.092 |  | 1.436 |  | 1.58144 | 40.8 |
| 4 | 35.844 | 3.657 | 2.872 | 3.518 |  |  |
| 5 | −35.844 |  | 1.436 |  | 1.58144 | 40.8 |
| 6 | 43.092 | 1.556 | 1.267 | 1.473 |  |  |
| 7 | 70.856 |  | 4.323 |  | 1.65844 | 50.8 |
| 8 | −28.153 |  |  |  |  |  | f = 100 (β = −1.0), F/NO = 6.3
Half field angle ω = 18.5° (β = −1.414)
Half field angle ω = 21.4° (β = −1.0)
Half field angle ω = 18.5° (β = −0.707)
Values of expression
$|f_1|/f = 0.311$
$|f_2|/f = 0.335$
$(\Delta d_2 + \Delta d_6)/\Delta d_4 = 0.631$ (β = −1.414)
$(\Delta d_2 + \Delta d_6)/\Delta d_4 = 0.759$ (β = −0.707)
$(\Delta d_2/\Delta d_6) = 0.714$ (β = −1.414)
$(\Delta d_2/\Delta d_6) = 1.378$ (β = −0.707)

What is claimed is:

1. A zoom lens system in a finite conjugate distance, said zoom lens system comprising, successively from an object side, a first lens comprising a biconvex lens, a second lens comprising a biconcave lens, a third lens comprising a biconcave lens, and a fourth lens comprising a biconvex lens;

wherein, distance between said first lens and second lens, distance between said third lens and fourth lens, and distance between said second lens and third lens when imaging magnification is reduced or enlarged are made larger than those under real-size magnification, and wherein the whole system is moved while distance from an object surface to an imaging surface is held substantially constant when magnification is varied.

2. A zoom lens system in a finite conjugate distance according to claim 1, wherein said lens system is configured so as to satisfy the following conditional expressions (1) to (5):

(1) $0.27 < |f_1|/f < 0.40$ (2) $0.30 < |f_2|/f < 0.44$ (3) $0.40 < (\Delta d_2 + \Delta d_6)/\Delta d_4 < 2.50$ (4) $0.40 < \Delta d_2/\Delta d_6 < 1.10$ (when $|\beta| \geq 1$)

(5) $0.90 < \Delta d_2/\Delta d_6 < 1.70$ (when $|\beta| < 1$)

wherein f is focal length of the whole system when magnification is −1.0;

$f_1$ is focal length of the first lens;

$f_2$ is focal length of the second lens;

β is magnification;

$\Delta d_2$ is (distance between the first lens and second lens when magnification β is $\beta_x$)−(distance between the first lens and second lens when magnification β is −1);

$\Delta d_4$ is (distance between the second lens and third lens when magnification β is $\beta_x$)−(distance between the second lens and third lens when magnification β is −1); and $\Delta d_6$ is (distance between the third lens and fourth lens when magnification β is $\beta_x$)−(distance between the third lens and fourth lens when magnification β is −1).

3. A zoom lens system in a finite conjugate distance according to claim 2, wherein assuming that lens surfaces are successively counted from the object side, absolute values of radii of curvature of first, second, third, and fourth lens surfaces are respectively identical to those of eighth, seventh, sixth, and fifth lens surfaces, and wherein center thickness values of said first and second lenses as well as refractive index values of materials thereof are respectively identical to those of said fourth and third lenses.

* * * * *